US011258598B2

(12) United States Patent
Yang et al.

(10) Patent No.: US 11,258,598 B2
(45) Date of Patent: Feb. 22, 2022

(54) SMARTPHONES BASED VEHICLE ACCESS

(71) Applicant: Huawei International Pte. Ltd., Singapore (SG)

(72) Inventors: Yanjiang Yang, Singapore (SG); Zhuo Wei, Singapore (SG); Cheng Kang Chu, Singapore (SG); Jie Shi, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 0 days.

(21) Appl. No.: 16/686,861

(22) Filed: Nov. 18, 2019

(65) Prior Publication Data

US 2020/0099522 A1  Mar. 26, 2020

Related U.S. Application Data

(63) Continuation of application No. PCT/SG2018/050244, filed on May 18, 2018.

(30) Foreign Application Priority Data

May 18, 2017 (SG) .............. 10201704077U

(51) Int. Cl.
*H04L 9/08* (2006.01)
*B60R 25/24* (2013.01)
(Continued)

(52) U.S. Cl.
CPC .......... *H04L 9/0866* (2013.01); *B60R 25/241* (2013.01); *H04L 9/0643* (2013.01);
(Continued)

(58) Field of Classification Search
CPC ................ G07C 5/008; H04W 12/04
See application file for complete search history.

(56) References Cited

U.S. PATENT DOCUMENTS 6,798,337 B2  9/2004  Onuma et al.
8,768,565 B2  7/2014  Jefferies et al.
(Continued)

FOREIGN PATENT DOCUMENTS

CN  102510333 A  6/2012
CN  105763558 A  7/2016
(Continued)

OTHER PUBLICATIONS

Busold et al., "Smart keys for cyber-cars: Secure smartphone-based NFC-enabled car immobilizer," CODASPY'13, San Antonio, Texas, pp. 1-10, Association for Computing Machinery, New York, New York (Feb. 18-20, 2013).

(Continued)

*Primary Examiner* — Fabricio R Murillo Garcia
(74) *Attorney, Agent, or Firm* — Leydig, Voit & Mayer, Ltd.

(57) ABSTRACT

A symmetric key-based generation and distribution system and method for a vehicle access authentication framework is provided, the framework comprising: a first device operated by a car owner, a second device operated by a delegated user, and a third device residing in a vehicle. The first device is configured to: request for an authentication key from the third device, the request for the authentication key comprising an ID of the first device, $id_O$; receive an authentication key $K_{id_O}$ from the third device; and generate a delegated authentication key $K_{id_U}$ based on authentication key $K_{id_O}$ and an ID of the second device in response to receiving a request for delegated authentication key from the second device, the request for delegated authentication key comprising the ID of the second device.

12 Claims, 10 Drawing Sheets

(51) Int. Cl.
  *H04L 9/06* (2006.01)
  *H04L 9/32* (2006.01)
  *H04W 88/02* (2009.01)

(52) U.S. Cl.
  CPC ............ *H04L 9/088* (2013.01); *H04L 9/0891* (2013.01); *H04L 9/0894* (2013.01); *H04L 9/3226* (2013.01); *H04L 9/3242* (2013.01); *H04L 9/3247* (2013.01); *B60R 2325/205* (2013.01); *H04L 2209/84* (2013.01); *H04W 88/02* (2013.01)

(56) References Cited

U.S. PATENT DOCUMENTS

| | | | | |
|---|---|---|---|---|
| 2001/0028295 | A1* | 10/2001 | Brinkmeyer | G07C 9/27 340/5.25 |
| 2003/0146820 | A1* | 8/2003 | Takamura | B60R 25/24 340/5.28 |
| 2010/0077474 | A1 | 3/2010 | Yacoub et al. | |
| 2010/0188189 | A1* | 7/2010 | Bald | G07C 9/00309 340/5.6 |
| 2013/0099892 | A1 | 4/2013 | Tucker et al. | |
| 2014/0365781 | A1 | 12/2014 | Dmitrienko et al. | |
| 2016/0236653 | A1 | 8/2016 | Katou et al. | |
| 2017/0134429 | A1* | 5/2017 | Gustafsson | H04L 9/3268 |
| 2017/0186251 | A1* | 6/2017 | Lee | G07C 9/20 |
| 2018/0186333 | A1* | 7/2018 | Santiano | B60R 25/24 |

FOREIGN PATENT DOCUMENTS

| | | |
|---|---|---|
| WO | 2016135418 A1 | 9/2016 |
| WO | 2016156681 A1 | 10/2016 |

OTHER PUBLICATIONS

Bauer et al., "Device-enabled authorization in the Grey System," 8th International conference on Information Security, pp. 431-445, Springer-Verlag Berlin Heidelberg, New York, New York (2005).

Timpner et al., "Secure Smartphone-based Registration and Key Deployment for Vehicle-to-Cloud Communications," pp. 1-6 (2013).

Han et al., "Short Paper:MVSec: Secure and easy-to-use pairing of mobile devices with vehicles," pp. 51-56 (2014).

Shamir, "Identity-Based Cryptosystems and Signature Schemes," Advances in Cryptology, CRYPTO '84, Lecture Notes in Computer Science, pp. 4753, Springer-Verlag Berlin Heidelberg, New York, New York (1985).

* cited by examiner

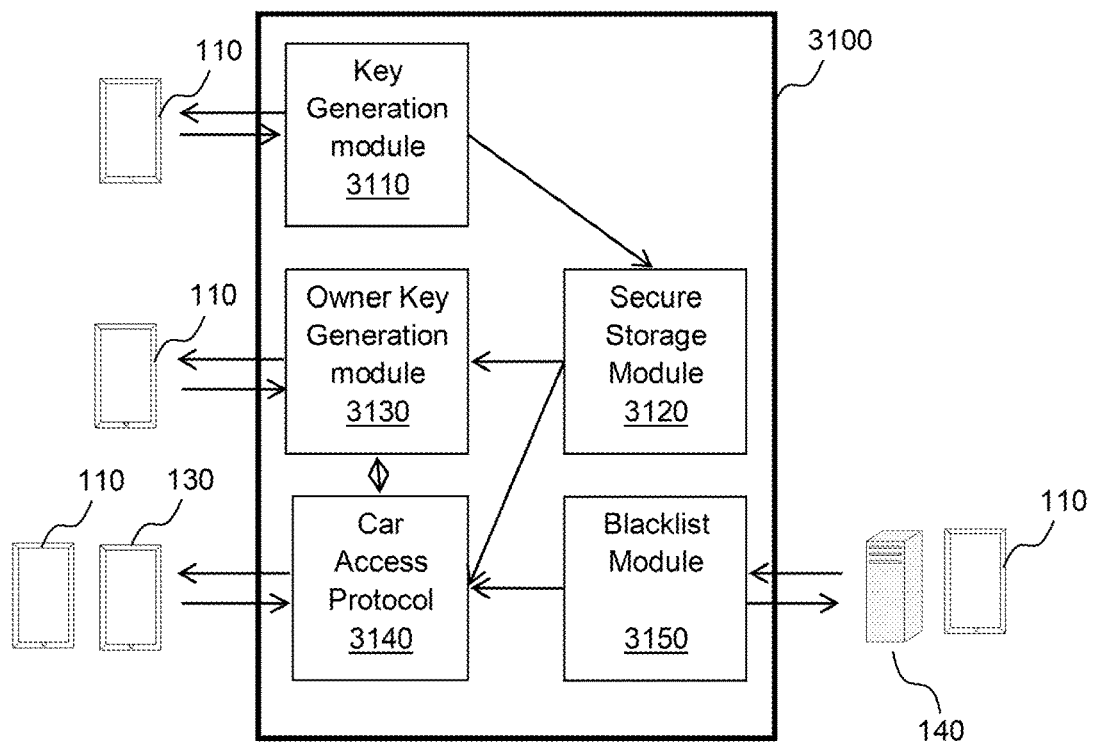
Figure 3.1
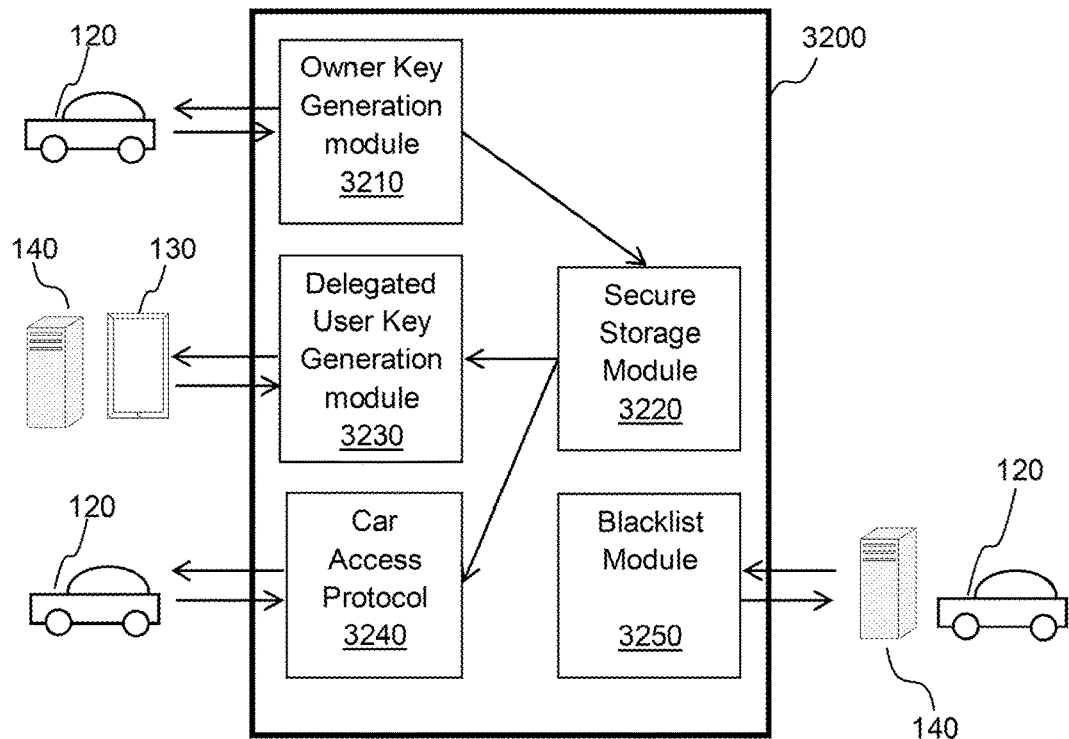
Figure 3.2

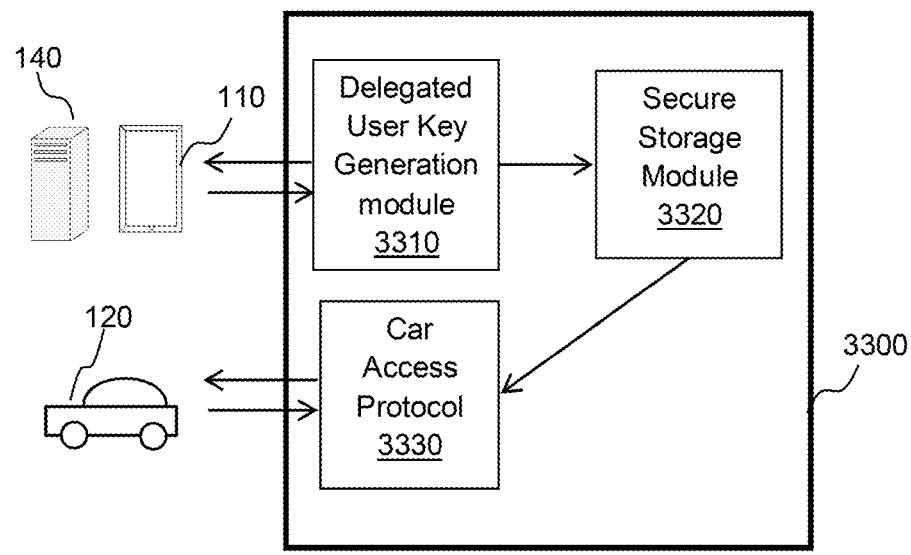
Figure 3.3
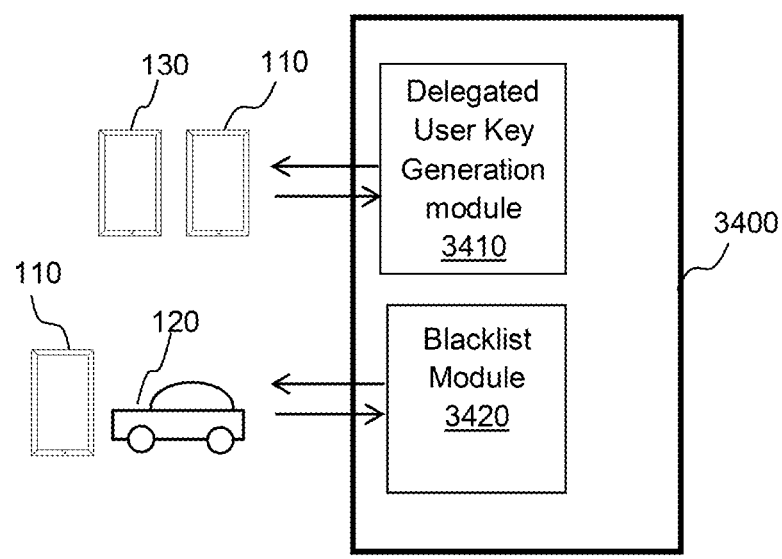
Figure 3.4

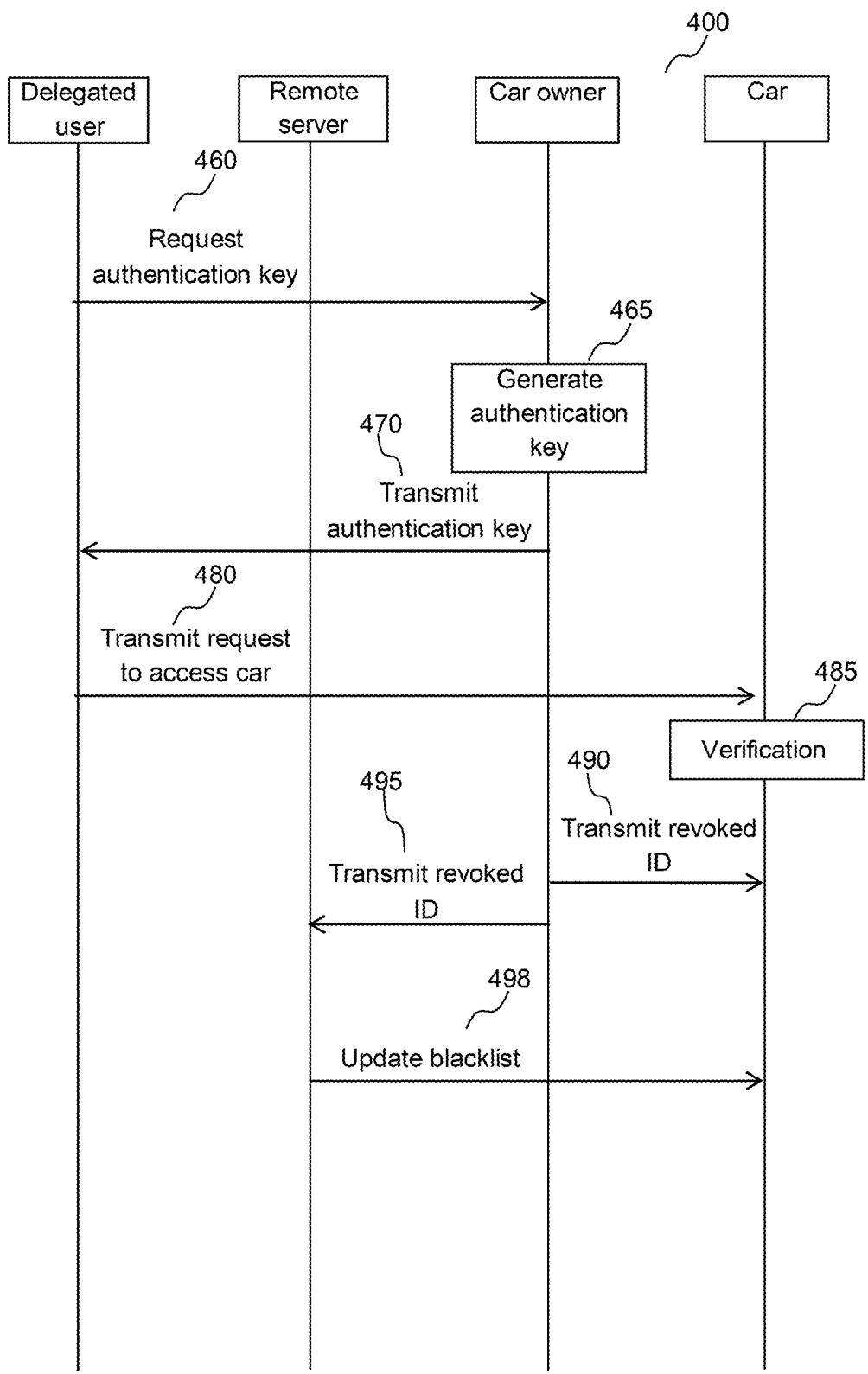
Figure 4 (continue)

SMARTPHONES BASED VEHICLE ACCESS

CROSS-REFERENCE TO RELATED APPLICATIONS

This application is a continuation of International Application No. PCT/SG2018/050244, filed on May 18, 2018, which claims priority to Singapore Patent Application No. SG10201704077U, filed on May 18, 2017. The disclosures of the aforementioned applications are hereby incorporated by reference in their entireties.

FIELD OF THE INVENTION

Embodiments of this disclosure relate to a vehicle access authentication framework. Particularly, embodiments of this disclosure relate to a method and system for generating and distributing keys among various entities for vehicle access.

SUMMARY OF THE PRIOR ART

Currently, vehicles access (e.g., car door opening, immobilizer/engine ignition) relies on physical keys or physical fobs. While having been in use for many years, physical keys/fobs become inconvenient for vehicle sharing which is a common phenomenon for family use and for car rental services. An example of vehicle sharing is that several family members may drive a family car at different times. Another example is that a car of a rental company is rented by different users over a time period. Vehicle sharing requires the sharing of the key for vehicle access, but physical keys are cumbersome to share, as pre-planning may be needed in order to pass the physical key from one person to another. A usual requirement in vehicle sharing is delegation of access rights for a short period of time. For example, a tourist touring foreign country only needs to rent a car for a certain period. Physical keys are especially inconvenient or unsafe for granting temporary vehicle access rights. In particular, once a physical key is passed to a delegated user, it is nearly impossible to prevent the delegated user from physically copying the key.

The landscape of the consumer electronics has changed drastically in recent years and portable devices, e.g., smart phones, smart watches, and smart pads, have become our daily necessity. This makes it possible for portable device-carried electronic keys to replace physical keys, so as to do away with the hassle of physical keys. In this regard, there have been a number of demonstrations and commercial products of electronic access key systems available, but without technical details revealed. Also, there is a plethora of research that is related to electronic access keys, and some of the typical examples are as follows.

In the publications "Christoph Busold, et al: Smart keys for cyber-cars: secure smartphone-based NFC-enabled Car Immobilizer, ACM CODASPY' 13 Feb. 2013" and "US 2014/0365781 A1", both publications also focus on car sharing and delegation of access rights. Particularly, it assumes a trusted server issue keys for vehicle access to car owners and in addition, to avoid directly registering a car owner's authentication key to the car owner's vehicle, a token containing the key (i.e. the token can be understood to be a sealed e-envelope) is also issued and the token can only be decrypted by the vehicle. In the vehicle access protocol, authentication data generated by using the authentication key together with the token is sent to the vehicle, which then decrypts the token to get the authentication key, and in turn uses the key to check against the authentication data.

In the systems disclosed in both publications, the authentication keys (for vehicle access) of all the car owners, delegated users and the vehicles are issued by or known to a trusted third party server. This creates vulnerability where a rouge insider of the trusted third party server can expose all the keys in the server due to the implementation of a centralised third party server for storing all the keys.

Further, the system disclosed in both publications adopts a token-based authentication method, where a car owner gets the authentication key and delegation key from the server, along with a sealed e-envelope containing these keys, which can only be opened by the car owner. When accessing the car by the car owner or a delegated user, the content in the sealed e-envelope must be communicated to the car, together with the actual authentication data. The sealed envelope adds to the communication overhead.

Hence, those skilled in the art are striving to provide a method of vehicle sharing without the hassle of passing physical keys or physical fobs to a car renter.

SUMMARY OF THE INVENTION

The above and other problems are solved and an advance in the state of art is made by systems and methods provided by embodiments in accordance with the disclosure. A first advantage of embodiments of systems and methods in accordance with the disclosure is that physical keys for vehicle access are replaced with portable device such as a mobile device. In view of the prevalent use of portable device in our daily life, this removes the need to carry a physical key around. A second advantage of embodiments of systems and methods in accordance with the disclosure is that it allows car owners to flexibly and securely delegate their access rights to other users, under fine-grained access policies. This overcomes the hindrance physical keys face in the scenario of car sharing. A third advantage of embodiments of systems and methods in accordance with the disclosure is that car owners and delegated users are able to use their portable devices for secured vehicle access. A fourth advantage of embodiments of systems and methods in accordance with the disclosure is that the cars independently generate their own secret keys and in turn the corresponding car owners' authentication keys. As a car belongs to the car owner, doing so basically means that the car owner controls all secret keys associated with his/her car. In addition, even if a car is compromised and the secret key it contains is exposed, no other cars will be affected, so there is no a single point of vulnerability of the entire system. In brief, this is a decentralised key generation and distribution system and method.

A first aspect of the disclosure describes a symmetric key-based generation and distribution system for a vehicle access authentication framework comprising: a first device operated by a car owner, a second device operated by a delegated user, and a third device residing in a vehicle. The first device is configured to: request for an authentication key from the third device, the request for the authentication key comprising an ID of the first device, $id_O$; receive an authentication key $K_{id_O}$ from the third device, wherein the authentication key $K_{id_O}$ is used to access the vehicle; and generate a delegated authentication key $K_{id_U}$ based on authentication key $K_{id_O}$ and an ID of the second device in response to receiving a request for delegated authentication key from the second device, the request for delegated authentication key comprising the ID of the second device.

Further, the first device is configure to generate a delegated authentication key $K_{id_U}$ based on the ID of the first device, the authentication key $K_{id_O}$ and an ID of the second device According to an embodiment of the first aspect, before the step to request for an authentication key from the third device, the first device is configured to initiate generating a car key with the third device; the step to initiate generating a car key with the third device comprises the first device to: generate and transmit a request to generate a new secret key; receive authentication request from the third device; and transmit a superuser password, provided by the car owner, to the third device.

According to an embodiment of the first aspect, the first device is configured to access the vehicle by sending an access request containing the authentication key $K_{id_O}$ to the third device; the step to access the vehicle by sending an access request containing the authentication key $K_{id_O}$ to the third device comprises the first device to: receive an ID of the third device and a random number, r, from the third device; compute vd via a Message Authentication Code (MAC) using a MAC generation function with $K_{id_O}$ and r as the input, $MAC(K_{id_O}, r)$; and transmit the access request containing [0, $id_O$, vd] to the third device where 0 denotes "owner access".

Further, the step to access the vehicle by sending an access request containing the authentication key $K_{id_O}$ to the third device further comprises the first device to: receive a new authentication key $K'_{id_O}$ from the third device; update the authentication key in memory with the new authentication key $K'_{id_O}$.

According to an embodiment of the first aspect, $K_{id_O}$=h(K, $id_{Car}$, $id_O$), where h(.) is a cryptographic hash function, $id_{Car}$ is the ID of the third device and the first device is configured to store the $K_{id_O}$ in a secured memory.

According to an embodiment of the first aspect, the step to generate a delegated authentication key $K_{id_U}$ comprises the first device to: receive the ID of the second device, $id_U$; determine an access policy $P_U$; and generate the delegated authentication key $K_{id_U}$, where $K_{id_U}$=h($K_{id_O}$, $id_U$, $P_U$); store the $K_{id_U}$ in the secured memory; and transmit the delegated authentication key to the second device.

According to an embodiment of the first aspect, the access policy $P_U$ includes one or more of validity period, speed limit, and mileage limit.

According to an embodiment of the first aspect, the first device is further configured to: update a blacklist in the third device.

According to an embodiment of the first aspect, the step to update the blacklist in the third device comprises the first device to: generates a revoke request containing an ID of the device to be revoked; and transmit the revoke request to the third device.

According to an embodiment of the first aspect, the second device is configured to: request delegated authentication key, the request for delegated authentication key comprising the ID of the second device, $id_U$; receive the delegated authentication key $K_{id_U}$ from the first device; and access the vehicle by sending an access request containing the delegated authentication key $K_{id_U}$ to the third device.

According to an embodiment of the first aspect, the step to access the vehicle by sending the access request containing the delegated authentication key $K_{id_U}$ to the third device comprises the second device to: receive an ID of the third device and a random number, r, from the third device; compute vd via a Message Authentication Code (MAC) using a MAC generation function with $K_{id_U}$ and r as the input, $MAC(K_{id_U}, r)$; and transmit the access request containing [1, $id_U$, $id_O$, $P_U$, vd] to the third device where 1 denotes "delegated user access".

According to an embodiment of the first aspect, the third device is configured to: generate a new secret key (K) in response to receiving the request to initiate generating a car key from the first device; generate the authentication key $K_{id_O}$ based on the ID of the first device in response to receiving the request for authentication key from the first device; verify a validity of information in the access request in response to receiving the access request; and unlock the vehicle in response to determining the request for access is valid.

According to an embodiment of the first aspect, the step to generate the new secret key (K) comprises the third device to: transmit an authentication request containing a request for the superuser password in response to response to receiving the request to generate the new secret key; receive the superuser password from the first device; verify the superuser password with the password stored on a secured memory of the third device; generate the secret key (K) in response to verifying the superuser password being identity to the password stored on the secured memory of the third device; and store the secret key in the secured memory in response to generating the secret key; and transmit a confirmation message indicating the secret key has been successfully created.

According to an embodiment of the first aspect, the step to generate the authentication key $K_{id_O}$ comprises the third device to: generates the authentication key $K_{id_O}$, where $K_{id_O}$=h(K, $id_{Car}$, $id_O$); store the $K_{id_O}$ in the secured memory; and transmit the authentication key to the first device.

According to an embodiment of the first aspect, the step to verify the validity of information in the access request comprises the third device to: first broadcast $id_{Car}$ and the random number r.

According to an embodiment of the first aspect, the step to verify the validity of information in the access request in response to receiving the access request comprises the third device to: identify whether the access request is "owner access" or "delegated user access" based on the first integer in the access request; determine the access request as "owner access" in response to the first integer in the access request being 0; and determine the access request as "delegated user access" in response to the first integer in the access request being 1.

According to an embodiment of the first aspect, the step to verify the validity of information in the access request in response to receiving the access request further comprises the third device to: in response to determining the access request as "owner access", verify a blacklist to determine whether the $id_O$ is in the blacklist; verify vd is equal to MAC(h(K, $id_{Car}$, $id_O$), r) in response to the $id_O$ being not in the blacklist; and grant access to the car in response to vd being equal to MAC(h(K, $id_{Car}$, $id_O$), r).

According to an embodiment of the first aspect, the step to verify the validity of information in the access request in response to receiving the access request further comprises the third device to: generate and transmit a new authentication key to the first device.

According to an embodiment of the first aspect, the step to verify the validity of information in the access request in response to receiving the access request further comprises the third device to: in response to determining the access request as "delegated user access", check a validity of the $P_U$; verify a blacklist to determine whether the $id_U$ is in the blacklist; verify vd is equal to MAC(h(h(K, $id_{Car}$, $id_O$), $id_U$, $P_U$), r) in response to the $id_U$ being not in the blacklist; and grant access to the car in response to vd being equal to MAC(h(h(K, $id_{Car}$, $id_O$), $id_U$, $P_U$), r).

According to an embodiment of the first aspect, the third device is further configured to: update the blacklist in response to receiving the update blacklist request from the first device.

According to an embodiment of the first aspect, the step to update the blacklist comprises the third device to: append the ID of the second device, ID of the device who delegated access to the second device, and the associated access policy $P_U$ on the blacklist.

According to an embodiment of the first aspect, the system further comprises a remote server configured to: receive messages from one of the first, second and third devices; and relay the messages to respective one the first, second and third devices.

In addition, the first device comprising a non-transitory memory, a processor and instructions stored on the memory executable by the processor to execute the above step; the second device comprising a non-transitory memory, a processor and instructions stored on the memory executable by the processor to execute the above step; the third device comprising a non-transitory memory, a processor and instructions stored on the memory executable by the processor to execute the above step.

A second aspect of the disclosure describes a symmetric key-based generation and distribution method for a vehicle access authentication framework having a first device operated by a car owner, a second device operated by a delegated user, and a third device residing in a vehicle. The method comprising the first device to: initiate generating a car key with the third device; request for an authentication key from the third device, the request for the authentication key comprising an ID of the first device, $id_O$; receive an authentication key $K_{id_O}$ from the third device; access the vehicle by sending an access request containing the authentication key $K_{id_O}$ to the third device; and generate a delegated authentication key $K_{id_U}$ based on the ID of the first device and an ID of the second device in response to receiving a request for delegated authentication key from the second device, the request for delegated authentication key comprising the ID of the second device.

According to an embodiment of the second aspect, the step to initiate generating a car key with the third device comprises the first device to: generate and transmit a request to generate a new secret key; receive authentication request from the third device; and transmit a superuser password, provided by the car owner, to the third device.

According to an embodiment of the second aspect, the step to access the vehicle by sending an access request containing the authentication key $K_{id_O}$ to the third device comprises the first device to: receive an ID of the third device and a random number, r, from the third device; compute vd via a Message Authentication Code (MAC) using a MAC generation function with $K_{id_O}$ and r as the input, MAC($K_{id_O}$, r); and transmit the access request containing [0, $id_O$, vd] to the third device where 0 denotes "owner access".

According to an embodiment of the second aspect, the step to access the vehicle by sending an access request containing the authentication key $K_{id_O}$ to the third device further comprises the first device to: receive a new authentication key $K'_{id_O}$ from the third device; update the authentication key in memory with the new authentication key $K'_{id_O}$.

According to an embodiment of the second aspect, $K_{id_O}$=h(K, $id_{Car}$, $id_O$), where h(.) is a cryptographic hash function, $id_{Car}$ is the ID of the third device and the first device is configured to store the $K_{id_O}$ in a secured memory.

According to an embodiment of the second aspect, the step to generate a delegated authentication key $K_{id_U}$ comprises the first device to: receive the ID of the second device, $id_U$; determine an access policy $P_U$; and generate the delegated authentication key $K_{id_U}$, where $K_{id_U}$=h($K_{id_O}$, $id_U$, $P_U$); store the $K_{id_U}$ in the secured memory; and transmit the delegated authentication key to the second device.

According to an embodiment of the second aspect, the access policy $P_U$ includes one or more of validity period, speed limit, and mileage limit.

According to an embodiment of the second aspect, the method further comprises the first device to: update a blacklist in the third device.

According to an embodiment of the second aspect, the step to update the blacklist in the third device comprises the first device to: generates a revoke request containing an ID of the device to be revoked; and transmit the revoke request to the third device.

According to an embodiment of the second aspect, the method further comprises the second device to: request delegated authentication key, the request for delegated authentication key comprising the ID of the second device, $id_U$; receive the delegated authentication key $K_{id_U}$ from the first device; and access the vehicle by sending an access request containing the delegated authentication key $K_{id_U}$ to the third device.

According to an embodiment of the second aspect, the step to access the vehicle by sending the access request containing the delegated authentication key $K_{id_U}$ to the third device comprises the second device to: receive an ID of the third device and a random number, r, from the third device; compute vd via a Message Authentication Code (MAC) using a MAC generation function with $K_{id_U}$ and r as the input, MAC($K_{id_U}$, r); and transmit the access request containing [1, $id_U$, $id_O$, $P_U$, vd] to the third device where 1 denotes "delegated user access".

According to an embodiment of the second aspect, the method further comprises the third device to: generate a new secret key (K) in response to receiving the request to initiate generating a car key from the first device; generate the authentication key $K_{id_O}$ based on the ID of the first device in response to receiving the request for authentication key from the first device; verify a validity of information in the access request in response to receiving the access request; and unlock the vehicle in response to determining the request for access is valid.

According to an embodiment of the second aspect, the step to generate the new secret key (K) comprises the third device to: transmit an authentication request containing a request for the superuser password in response to response to receiving the request to generate the new secret key; receive the superuser password from the first device; verify the superuser password with the password stored on a secured memory of the third device; generate the secret key (K) in response to verifying the superuser password being identity to the password stored on the secured memory of the third device; and store the secret key in the secured memory in response to generating the secret key; and transmit a confirmation message indicating the secret key has been successfully created.

According to an embodiment of the second aspect, the step to generate the authentication key $K_{id_O}$ comprises the third device to: generates the authentication key $K_{id_O}$, where $K_{id_O}$=h(K, $id_{Car}$, $id_O$); store the $K_{id_O}$ in the secured memory; and transmit the authentication key to the first device.

According to an embodiment of the second aspect, the step to verify the validity of information in the access request comprises the third device to: first broadcast $id_{Car}$ and the random number r.

According to an embodiment of the second aspect, the step to verify the validity of information in the access request in response to receiving the access request comprises the third device to: identify whether the access request is "owner access" or "delegated user access" based on the first integer in the access request; determine the access request as "owner access" in response to the first integer in the access request being 0; and determine the access request as "delegated user access" in response to the first integer in the access request being 1.

According to an embodiment of the second aspect, the step to verify the validity of information in the access request in response to receiving the access request further comprises the third device to: in response to determining the access request as "owner access", verify a blacklist to determine whether the $id_O$ is in the blacklist; verify vd is equal to MAC(h(K, $id_{Car}$, $id_O$), r) in response to the $id_O$ being not in the blacklist; and grant access to the car in response to vd being equal to MAC(h(K, $id_{Car}$, $id_O$), r).

According to an embodiment of the second aspect, the step to verify the validity of information in the access request in response to receiving the access request further comprises the third device to: generate and transmit a new authentication key to the first device.

According to an embodiment of the second aspect, the step to verify the validity of information in the access request in response to receiving the access request further comprises the third device to: in response to determining the access request as "delegated user access", check a validity of the $P_U$; verify a blacklist to determine whether the $id_U$ is in the blacklist; verify vd is equal to MAC(h(h(K, $id_{Car}$, $id_O$), $id_U$, $P_U$), r) in response to the $id_U$ being not in the blacklist; and grant access to the car in response to vd being equal to MAC(h(h(K, $id_{Car}$, $id_O$), $id_U$, $P_U$), r).

According to an embodiment of the second aspect, the method further comprises the third device to: update the blacklist in response to receiving the update blacklist request from the first device.

According to an embodiment of the second aspect, the step to update the blacklist comprises the third device to: append the ID of the second device, ID of the device who delegated access to the second device, and the associated access policy $P_U$ on the blacklist.

According to an embodiment of the second aspect, the method further comprises a remote server to: receive messages from one of the first, second and third devices; and relay the messages to respective one the first, second and third devices.

A third aspect of the disclosure describes an Identity Based Signature (IBS) based key generation and distribution system for a vehicle access authentication framework comprising: a first device operated by a car owner, a second device operated by a delegated user, and a third device residing in a vehicle. The first device is configured to: initiate generating a car key with the third device; request for a first level authentication key from the third device, the request for the first level authentication key comprising an ID of the first device, $id_{O,1}$; receive the first level authentication key $sk_{id_{O,1}}$ from the third device; access the vehicle by sending an access request containing the first level authentication key $sk_{id_{O,1}}$ to the third device; and generate a second level authentication key $sk_{id_{U,2}}$ based on the ID of the first level authentication key of the first device and an ID of the second device in response to receiving a request for second level authentication key from the second device, the request for second level authentication key comprising the ID of the second device.

According to an embodiment of the third aspect, the step to initiate generating a car key with the third device comprises the first device to: generate and transmit a request to generate a new secret key; receive authentication request from the third device; and transmit a superuser password, provided by the car owner, to the third device.

According to an embodiment of the third aspect, the step to access the vehicle by sending the access request containing the authentication key $sk_{id_{O,1}}$ to the third device comprises the first device to: receive an ID of the third device and a random number, r, from the third device; compute a signature σ via a signing algorithm, HSign($sk_{id_{O,1}}$, r), taking as input the first level authentication key and the random number r, and outputting the signature σ; and transmit the access request containing [0, $id_{O,1}$, σ] to the third device where 0 denotes "owner access".

According to an embodiment of the third aspect, the step to generate a second level authentication key $sk_{id_{U,2}}$ comprises the first device to: receive the ID of the second device, $id_{U,2}$, determine an access policy $P_{id_{U,2}}$; and generate the second level authentication key $sk_{id_{U,2}}$ via a key generation algorithm, HKeyGen($sk_{id_{O,1}}$, $id_{U,2}$, $P_{id_{U,2}}$), taking as input the first level authentication key, the ID of the second device and the access policy $P_{id_{U,2}}$ for $id_{U,2}$ and outputting the second level authentication key; store the second level authentication key $sk_{id_{U,2}}$ in the secured memory; and transmit the GPK and second level authentication key $sk_{id_{U,2}}$ to the second device.

According to an embodiment of the third aspect, the access policy $P_{id_{U,2}}$ include one or more of validity period, speed limit, and mileage limit.

According to an embodiment of the third aspect, the first device is further configured to: update a blacklist in the third device.

According to an embodiment of the third aspect, the step to update the blacklist in the third device comprises the first device to: generates a revoke request containing an ID of the device to be revoked; and transmit the revoke request to the third device.

According to an embodiment of the third aspect, the second device is configured to: request a second level authentication key, the request for the second level authentication key comprising the ID of the second device, $id_{U,2}$; receive the second level authentication key $sk_{id_{U,2}}$ from the first device; and access the vehicle by sending an access request containing the delegated authentication key $sk_{id_{U,2}}$ to the third device.

According to an embodiment of the third aspect, the step to access the vehicle by sending the access request containing the second level authentication key $sk_{id_{U,2}}$ to the third device comprises the second device to: receive an ID of the third device and a random number, r, from the third device; compute a signature σ via a signing algorithm, HSign($sk_{id_{U,2}}$, r), taking as input the second level authentication key and the random number r, and outputting the signature σ; and transmit the access request containing [1, $id_{U,2}$, $id_{O,1}$, $P_{id_{U,2}}$, σ] to the third device where 1 denotes "delegated user access".

According to an embodiment of the third aspect, the third device is configured to: generate a new secret key (GSK) via a system setup algorithm, HSetUp($1^k$), that generates a global key pair GPK and GSK, where k is the security parameter in response to receiving the request to initiate generating a car key from the first device; generate the first level authentication key $sk_{id_{O,1}}$ based on the ID of the first device in response to receiving the request for the first level authentication key from the first device; verify a validity of information in the access request in response to receiving the access request; and unlock the vehicle in response to determining the request for access is valid.

According to an embodiment of the third aspect, the step to generate the new secret key (K) comprises the third device to: transmit an authentication request containing a request for the superuser password in response to response to receiving the request to generate the new secret key; receive the superuser password from the first device; verify the superuser password with the password stored on a secured memory of the third device; generate the secret key (GSK) in response to verifying the superuser password being identity to the password stored on the secured memory of the third device; and store the secret key in the secured memory in response to generating the secret key; and transmit a confirmation message indicating the secret key has been successfully created.

According to an embodiment of the third aspect, the step to generate the first level authentication key $sk_{id_{O,1}}$ comprises the third device to: generate the first level authentication key $sk_{id_{O,1}}$, via the key generation algorithm, HKeyGen(GSK, $id_{O,1}$, NULL), taking as input the GSK, the ID of the first device and outputting the first level authentication key; store the first level authentication key $sk_{id_{O,1}}$ in the secured memory; and transmit the GPK and first level authentication key $sk_{id_{O,1}}$ to the first device.

According to an embodiment of the third aspect, the step to verify the validity of information in the access request in response to receiving the access request comprises the third device to: first broadcast $id_{Car}$ and the random number r.

According to an embodiment of the third aspect, the step to verify the validity of information in the access request in response to receiving the access request comprises the third device to: identify whether the access request is "owner access" or "delegated user access" based on the first integer in the access request; determine the access request as "owner access" in response to the first integer in the access request being 0; and determine the access request as "delegated user access" in response to the first integer in the access request being 1.

According to an embodiment of the third aspect, the step to verify the validity of information in the access request in response to receiving the access request further comprises the third device to: in response to determining the access request as "owner access", verify a blacklist to determine whether the $id_O$ is in the blacklist; verify σ via a signature verification algorithm, HVerify(σ, r, $id_{O,1}$, NULL, GPK), taking as input the signature σ, the random number r, the ID of the first device, and GPK; and grant access to the car in response to the output of the signature verification algorithm being 1.

According to an embodiment of the third aspect, the step to verify the validity of information in the access request in response to receiving the access request further comprises the third device to: in response to determining the access request as "delegated user access", check a validity of the $P_{id_{U,2}}$; verify a blacklist to determine whether the $id_O$ is in the blacklist; verify σ via a signature verification algorithm, HVerify(σ, r, $id_{U,2}$, $P_{id_{U,2}}$, $id_{O,1}$, NULL, GPK), taking as input the signature σ, the random number r, the ID of the second device, the $P_{id_{U,2}}$, the ID of the first device, and GPK; and grant access to the car in response to the output of the signature verification algorithm being 1.

According to an embodiment of the third aspect, the third device is further configured to: update the blacklist in response to receiving the update blacklist request from the first device.

According to an embodiment of the third aspect, the step to update the blacklist comprises the third device to: append the ID of the second device, ID of the device who delegated access to the second device, and the associated access policy $P_{id_{U,2}}$ on the blacklist.

According to an embodiment of the third aspect, the system further comprising a remote server configured to: receive messages from one of the first, second and third devices; and relay the messages to respective one the first, second and third devices.

A fourth aspect of the disclosure describes an Identity Based Signature (IBS) based key generation and distribution method for a vehicle access authentication framework having a first device operated by a car owner, a second device operated by a delegated user, and a third device residing in a vehicle. The method comprising the first device to: initiate generating a car key with the third device; request for a first level authentication key from the third device, the request for the first level authentication key comprising an ID of the first device, $id_{O,1}$; receive the first level authentication key $sk_{id_{O,1}}$ from the third device; access the vehicle by sending an access request containing the first level authentication key $sk_{id_{O,1}}$ to the third device; and generate a second level authentication key $sk_{id_{U,2}}$ based on the ID of the first level authentication key of the first device and an ID of the second device in response to receiving a request for second level authentication key from the second device, the request for second level authentication key comprising the ID of the second device.

According to an embodiment of the fourth aspect, the step to initiate generating a car key with the third device comprises the first device to: generate and transmit a request to generate a new secret key; receive authentication request from the third device; and transmit a superuser password, provided by the car owner, to the third device.

According to an embodiment of the fourth aspect, the step to access the vehicle by sending the access request containing the authentication key $sk_{id_{O,1}}$ to the third device comprises the first device to: receive an ID of the third device and a random number, r, from the third device; compute a signature σ via a signing algorithm, HSign($sk_{id_{O,1}}$, r), taking as input the first level authentication key and the random number r, and outputting the signature σ; and transmit the access request containing [0, $id_{O,1}$, σ] to the third device where 0 denotes "owner access".

According to an embodiment of the fourth aspect, the step to generate a second level authentication key $sk_{id_{U,2}}$ comprises the first device to: receive the ID of the second device, $id_{U,2}$, determine an access policy $P_{id_{U,2}}$; and generate the second level authentication key $sk_{id_{U,2}}$, via a key generation algorithm, HKeyGen($sk_{id_{O,1}}$, $id_{U,2}$, $P_{id_{U,2}}$), taking as input the first level authentication key, the ID of the second device and the access policy $P_{id_{U,2}}$ for $id_{U,2}$ and outputting the second level authentication key; store the second level authentication key $sk_{id_{U,2}}$ in the secured memory; and transmit the GPK and second level authentication key $sk_{id_{U,2}}$ to the second device.

According to an embodiment of the fourth aspect, the access policy $P_{id_{U,2}}$ include one or more of validity period, speed limit, and mileage limit.

According to an embodiment of the fourth aspect, the first device is further configured to: update a blacklist in the third device.

According to an embodiment of the fourth aspect, the step to update the blacklist in the third device comprises the first device to: generates a revoke request containing an ID of the device to be revoked; and transmit the revoke request to the third device.

According to an embodiment of the fourth aspect, the method further comprises the second device to: request a second level authentication key, the request for the second level authentication key comprising the ID of the second device, $id_{U,2}$; receive the second level authentication key $sk_{id_{U,2}}$ from the first device; and access the vehicle by sending an access request containing the delegated authentication key $sk_{id_{U,2}}$ to the third device.

According to an embodiment of the fourth aspect, the step to access the vehicle by sending the access request containing the second level authentication key $sk_{id_{U,2}}$ to the third device comprises the second device to: receive an ID of the third device and a random number, r, from the third device; compute a signature σ via a signing algorithm, HSign($sk_{id_{U,2}}$, r), taking as input the second level authentication key and the random number r, and outputting the signature σ; and transmit the access request containing [1, $id_{U,2}$, $id_{O,1}$, $P_{id_{U,2}}$, σ] to the third device where 1 denotes "delegated user access".

According to an embodiment of the fourth aspect, the method further comprises the third device to: generate a new secret key (GSK) via a system setup algorithm, HSetUp($1^k$), that generates a global key pair GPK and GSK, where k is the security parameter in response to receiving the request to initiate generating a car key from the first device; generate the first level authentication key $sk_{id_{O,1}}$ based on the ID of the first device in response to receiving the request for the first level authentication key from the first device; verify a validity of information in the access request in response to receiving the access request; and unlock the vehicle in response to determining the request for access is valid.

According to an embodiment of the fourth aspect, the step to generate the new secret key (K) comprises the third device to: transmit an authentication request containing a request for the superuser password in response to response to receiving the request to generate the new secret key; receive the superuser password from the first device; verify the superuser password with the password stored on a secured memory of the third device; generate the secret key (GSK) in response to verifying the superuser password being identity to the password stored on the secured memory of the third device; and store the secret key in the secured memory in response to generating the secret key; and transmit a confirmation message indicating the secret key has been successfully created.

According to an embodiment of the fourth aspect, the step to generate the first level authentication key $sk_{id_{O,1}}$ comprises the third device to: generate the first level authentication key $sk_{id_{O,1}}$ via the key generation algorithm, HKeyGen(GSK, $id_{O,1}$, NULL), taking as input the GSK, the ID of the first device and outputting the first level authentication key; store the first level authentication key $sk_{id_{O,1}}$ in the secured memory; and transmit the GPK and first level authentication key $sk_{id_{O,1}}$ to the first device.

According to an embodiment of the fourth aspect, the step to verify the validity of information in the access request in response to receiving the access request comprises the third device to: first broadcast $id_{Car}$ and the random number r.

According to an embodiment of the fourth aspect, the step to verify the validity of information in the access request in response to receiving the access request comprises the third device to: identify whether the access request is "owner access" or "delegated user access" based on the first integer in the access request; determine the access request as "owner access" in response to the first integer in the access request being 0; and determine the access request as "delegated user access" in response to the first integer in the access request being 1.

According to an embodiment of the fourth aspect, the step to verify the validity of information in the access request in response to receiving the access request further comprises the third device to: in response to determining the access request as "owner access", verify a blacklist to determine whether the $id_O$ is in the blacklist; verify σ via a signature verification algorithm, HVerify(σ, r, $id_{O,1}$, NULL, GPK), taking as input the signature σ, the random number r, the ID of the first device, and GPK; and grant access to the car in response to the output of the signature verification algorithm being 1.

According to an embodiment of the fourth aspect, the step to verify the validity of information in the access request in response to receiving the access request further comprises the third device to: in response to determining the access request as "delegated user access", check a validity of the $P_{id_{U,2}}$; verify a blacklist to determine whether the $id_O$ is in the blacklist; verify σ via a signature verification algorithm, HVerify(σ, r, $id_{U,2}$, $P_{id_{U,2}}$, $id_{O,1}$, NULL, GPK), taking as input the signature σ, the random number r, the ID of the second device, the $P_{id_{U,2}}$, the ID of the first device, and GPK; and grant access to the car in response to the output of the signature verification algorithm being 1.

According to an embodiment of the fourth aspect, the method further comprises the third device to: update the blacklist in response to receiving the update blacklist request from the first device.

According to an embodiment of the fourth aspect, the step to update the blacklist comprises the third device to: append the ID of the second device, ID of the device who delegated access to the second device, and the associated access policy $P_{id_{U,2}}$ on the blacklist.

According to an embodiment of the fourth aspect, the method further comprises a remote server to: receive messages from one of the first, second and third devices; and relay the messages to respective one the first, second and third devices.

A fifth aspect of the disclosure describes a digital signature-based key generation and distribution system for a vehicle access authentication framework comprising: a first device operated by a car owner, a second device operated by a delegated user, and a third device residing in a vehicle. The first device is configured to: initiate generating a car key with the third device; request for a digital certificate from the third device, the request for the digital certificate comprising a public key, $PK_O$, generated by the first device; receive the digital certificate $σ_{C,O}$ from the third device; access the vehicle by sending an access request containing the digital certificate to the third device; and generate a delegated digital certificate $σ_{O,U}$ based on a public key generated by the second device in response to receiving a request for delegated digital certificate from the second device.

According to an embodiment of the fifth aspect, the step to initiate generating a car key with the third device comprises the first device to: generate and transmit a request to generate a new secret key; receive authentication request from the third device; and transmit a superuser password, provided by the car owner, to the third device.

According to an embodiment of the fifth aspect, the step to request for the digital certificate from the third device comprises the first device to: execute a key generation algorithm, KeyGen($1^k$), which takes as input security parameter $1^k$, and outputs a pair of keys ($PK_O$, $SK_O$); transmits $PK_O$ to the third device; receive digital certificate, $\sigma_{C,O}$, from the third device; and stores $SK_O$ securely in secure storage module.

According to an embodiment of the fifth aspect, the step to access the vehicle by sending the access request containing the digital certificate to the third device comprises the first device to: receive an ID of the third device and a random number, r, from the third device; compute a signature $\sigma$ via a signing algorithm, Sign($SK_O$, r), taking as input the private key of the first device, $SK_O$ and the random number r, and outputting the signature $\sigma$; and transmit the access request containing [0, $PK_O$, $\sigma_{C,O}$, $\sigma$] to the third device where 0 denotes "owner access".

According to an embodiment of the fifth aspect, the step to generate the delegated digital certificate $\sigma_{O,U}$ comprises the first device to: receive a public key $PK_U$ generated by the third device; determine an access policy $P_U$; and generate the delegated digital certificate $\sigma_{O,U}$, via the signing algorithm, Sign($SK_O$, $PK_U\|P_U$), taking as input the $SK_O$, and the public key of the second device and the access policy $PK_U\|P_U$ and outputting delegated digital certificate $\sigma_{O,U}$; store the delegated digital certificate $\sigma_{O,U}$ in the secured memory; and transmit $PK_O$ and $\sigma_{C,O}$ and the delegated digital certificate $\sigma_{O,U}$ to the second device.

According to an embodiment of the fifth aspect, the access policy $P_U$ includes one or more of validity period, speed limit, and mileage limit.

According to an embodiment of the fifth aspect, the first device is further configured to: update a blacklist in the third device.

According to an embodiment of the fifth aspect, the step to update the blacklist in the third device comprises the first device to: generates a revoke request containing an ID of the device to be revoked; and transmit the revoke request to the third device.

According to an embodiment of the fifth aspect, the second device is configured to: request a delegated digital certificate, the request for the second level authentication key comprising the public key generated by the second device; receive the delegated digital certificate from the first device; and access the vehicle by sending an access request containing the delegated digital certificate to the third device.

According to an embodiment of the fifth aspect, the step to request the delegated digital certificate comprises the second device to: execute the key generation algorithm, KeyGen($1^k$), which takes as input security parameter $1^k$, and outputs a pair of keys ($PK_U$, $SK_U$); transmits $PK_U$ to the first device; receive $PK_O$, $\sigma_{C,O}$ and the delegated digital certificate, $\sigma_{C,U}$, from the first device; and stores $SK_U$ securely in a secure storage module.

According to an embodiment of the fifth aspect, the step to access the vehicle by sending the access request comprises the second device to: receive an ID of the third device and a random number, r, from the third device; compute a signature $\sigma$ via the signing algorithm, Sign($SK_U$, r), taking as input the private key of the second device, $SK_U$ and the random number r, and outputting the signature $\sigma$; and transmit the access request containing [1, $PK_U$, $P_U$, $\sigma_{O,U}$, $PK_O$, $\sigma_{C,O}$, $\sigma$] to the third device where 1 denotes "delegated user access".

According to an embodiment of the fifth aspect, the third device is configured to: generate a new secret key ($SK_C$) via the key generation algorithm, KeyGen($1^k$), that generates a global key pair $PK_C$, $SK_C$, where k is the security parameter in response to receiving the request to initiate generating a car key from the first device; generate the digital certificate based on the public key of the first device in response to receiving the request for the digital certificate from the first device; verify a validity of information in the access request in response to receiving the access request; and unlock the vehicle in response to determining the request for access is valid.

According to an embodiment of the fifth aspect, the step to generate the new secret key ($SK_C$) comprises the third device to: transmit an authentication request containing a request for the superuser password in response to response to receiving the request to generate the new secret key; receive the superuser password from the first device; verify the superuser password with the password stored on a secured memory of the third device; generate the global key pair $PK_C$, $SK_C$, in response to verifying the superuser password being identity to the password stored on the secured memory of the third device; store the global key pair $PK_C$, $SK_C$, in the secured memory; and transmit a confirmation message indicating the secret key has been successfully created.

According to an embodiment of the fifth aspect, the step to generate the digital certificate comprises the third device to: receive a public key $PK_O$ generated by the first device; generate the digital certificate $\sigma_{C,O}$, via the signing algorithm, Sign($SK_C$, $PK_O$), taking as input the $SK_C$, and the public key of the first device and outputting digital certificate $\sigma_{C,O}$; store the delegated digital certificate $\sigma_{C,O}$ in the secured memory; and transmit the delegated digital certificate $\sigma_{C,O}$ to the second device.

According to an embodiment of the fifth aspect, the step to verify the validity of information in the access request in response to receiving the access request comprises the third device to: broadcast $id_{Car}$ and the random number r.

According to an embodiment of the fifth aspect, the step to verify the validity of information in the access request in response to receiving the access request comprises the third device to: identify whether the access request is "owner access" or "delegated user access" based on the first integer in the access request; determine the access request as "owner access" in response to the first integer in the access request being 0; and determine the access request as "delegated user access" in response to the first integer in the access request being 1.

According to an embodiment of the fifth aspect, the step to verify the validity of information in the access request in response to receiving the access request further comprises the third device to: in response to determining the access request as "owner access", verify a blacklist to determine whether the public key of the first device is in the blacklist; verify $\sigma$ via a first verification algorithm, Verify($\sigma_{C,O}$, $PK_O$, $PK_C$), taking as input the signature $\sigma_{C,O}$, the public key of the first device, and the public key of the third device and a second signature verification algorithm, Verify($\sigma$, r, $PK_O$), taking as input the signature $\sigma$, the random number r, the public key of the first device; and grant access to the car in response to the output of the first and second signature verification algorithms being 1.

According to an embodiment of the fifth aspect, the step to verify the validity of information in the access request in response to receiving the access request further comprises the third device to: in response to determining the access request as "delegated user access", check a validity of the $P_U$; verify a blacklist to determine whether the public key of the second device is in the blacklist; verify σ via a third signature verification algorithm, Verify($\sigma_{C,O}$, $PK_O$, $PK_C$), taking as input the signature $\sigma_{C,O}$, the public key of the first device, and the public key of the third device, a fourth signature verification algorithm, Verify($\sigma_{O,U}$, $PK_U$∥$P_U$, $PK_O$), taking as input the signature $\sigma_{O,U}$, the public key of the second device and the policy $PK_U$∥$P_U$, and the public key of the first device, and a fifth signature verification algorithm, Verify(σ, r, $PK_U$) taking as input the signature σ, the random number r, the public key of the second device; and grant access to the car in response to the output of the third, fourth and fifth signature verification algorithms being 1.

According to an embodiment of the fifth aspect, the third device is further configured to: update the blacklist in response to receiving the update blacklist request from the first device.

According to an embodiment of the fifth aspect, the step to update the blacklist comprises the third device to: append the public key of the second device, public key of the device who delegated access to the second device, and the associated access policy $P_U$ on the blacklist.

According to an embodiment of the fifth aspect, the system further comprising a remote server configured to: receive messages from one of the first, second and third devices; and relay the messages to respective one the first, second and third devices.

A sixth aspect of the disclosure describes a digital signature-based key generation and distribution system for a vehicle access authentication framework having a first device operated by a car owner, a second device operated by a delegated user, and a third device residing in a vehicle. The method comprising the first device to: initiate generating a car key with the third device; request for a digital certificate from the third device, the request for the digital certificate comprising a public key, $PK_O$, generated by the first device; receive the digital certificate $\sigma_{C,O}$ from the third device; access the vehicle by sending an access request containing the digital certificate to the third device; and generate a delegated digital certificate $\sigma_{O,U}$ based on a public key generated by the second device in response to receiving a request for delegated digital certificate from the second device.

According to an embodiment of the sixth aspect, the step to initiate generating a car key with the third device comprises the first device to: generate and transmit a request to generate a new secret key; receive authentication request from the third device; and transmit a superuser password, provided by the car owner, to the third device.

According to an embodiment of the sixth aspect, the step to request for the digital certificate from the third device comprises the first device to: execute a key generation algorithm, KeyGen($1^k$), which takes as input security parameter $1^k$, and outputs a pair of keys ($PK_O$, $SK_O$); transmits $PK_O$ to the third device; receive digital certificate, $\sigma_{C,O}$, from the third device; and stores $SK_O$ securely in secure storage module.

According to an embodiment of the sixth aspect, the step to access the vehicle by sending the access request containing the digital certificate to the third device comprises the first device to: receive an ID of the third device and a random number, r, from the third device; compute a signature σ via a signing algorithm, Sign($SK_O$, r), taking as input the private key of the first device, $SK_O$ and the random number r, and outputting the signature σ; and transmit the access request containing [0, $PK_O$, $\sigma_{C,O}$, σ] to the third device where 0 denotes "owner access".

According to an embodiment of the sixth aspect, the step to generate the delegated digital certificate $\sigma_{O,U}$ comprises the first device to: receive a public key $PK_U$ generated by the third device; determine an access policy $P_U$; and generate the delegated digital certificate $\sigma_{O,U}$, via the signing algorithm, Sign($SK_O$, $PK_U$∥$P_U$), taking as input the $SK_O$, and the public key of the second device and the access policy $PK_U$∥$P_U$ and outputting delegated digital certificate $\sigma_{O,U}$; store the delegated digital certificate $\sigma_{O,U}$ in the secured memory; and transmit $PK_O$ and $\sigma_{C,O}$ and the delegated digital certificate $\sigma_{O,U}$ to the second device.

According to an embodiment of the sixth aspect, the access policy $P_U$ includes one or more of validity period, speed limit, and mileage limit.

According to an embodiment of the sixth aspect, the method further comprises the first device to: update a blacklist in the third device.

According to an embodiment of the sixth aspect, the step to update the blacklist in the third device comprises the first device to: generates a revoke request containing an ID of the device to be revoked; and transmit the revoke request to the third device.

According to an embodiment of the sixth aspect, the method further comprises the second device to: request a delegated digital certificate, the request for the second level authentication key comprising the public key generated by the second device; receive the delegated digital certificate from the first device; and access the vehicle by sending an access request containing the delegated digital certificate to the third device.

According to an embodiment of the sixth aspect, the step to request the delegated digital certificate comprises the second device to: execute the key generation algorithm, KeyGen($1^k$), which takes as input security parameter $1^k$, and outputs a pair of keys ($PK_U$, $SK_U$); transmits $PK_U$ to the first device; receive $PK_O$, $\sigma_{C,O}$ and the delegated digital certificate, $\sigma_{C,U}$, from the first device; and stores $SK_U$ securely in a secure storage module.

According to an embodiment of the sixth aspect, the step to access the vehicle by sending the access request comprises the second device to: receive an ID of the third device and a random number, r, from the third device; compute a signature σ via the signing algorithm, Sign($SK_U$, r), taking as input the private key of the second device, $SK_U$ and the random number r, and outputting the signature σ; and transmit the access request containing [1, $PK_U$, $P_U$, $\sigma_{O,U}$, $PK_O$, $\sigma_{C,O}$, σ] to the third device where 1 denotes "delegated user access".

According to an embodiment of the sixth aspect, the method further comprises the third device to: generate a new secret key ($SK_C$) via the key generation algorithm, KeyGen ($1^k$), that generates a global key pair $PK_C$, $SK_C$, where k is the security parameter in response to receiving the request to initiate generating a car key from the first device; generate the digital certificate based on the public key of the first device in response to receiving the request for the digital certificate from the first device; verify a validity of information in the access request in response to receiving the access request; and unlock the vehicle in response to determining the request for access is valid.

According to an embodiment of the sixth aspect, the step to generate the new secret key ($SK_C$) comprises the third device to: transmit an authentication request containing a request for the superuser password in response to response to receiving the request to generate the new secret key; receive the superuser password from the first device; verify the superuser password with the password stored on a secured memory of the third device; generate the global key pair $PK_C$, $SK_C$, in response to verifying the superuser password being identity to the password stored on the secured memory of the third device; store the global key pair $PK_C$, $SK_C$, in the secured memory; and transmit a confirmation message indicating the secret key has been successfully created.

According to an embodiment of the sixth aspect, the step to generate the digital certificate comprises the third device to: receive a public key $PK_O$ generated by the first device; generate the digital certificate $\sigma_{C,O}$, via the signing algorithm, Sign($SK_C$, $PK_O$), taking as input the $SK_C$, and the public key of the first device and outputting digital certificate $\sigma_{C,O}$; store the delegated digital certificate $\sigma_{C,O}$ in the secured memory; and transmit the delegated digital certificate $\sigma_{C,O}$ to the second device.

According to an embodiment of the sixth aspect, the step to verify the validity of information in the access request in response to receiving the access request comprises the third device to: broadcast $id_{Car}$ and the random number r.

According to an embodiment of the sixth aspect, the step to verify the validity of information in the access request in response to receiving the access request comprises the third device to: identify whether the access request is "owner access" or "delegated user access" based on the first integer in the access request; determine the access request as "owner access" in response to the first integer in the access request being 0; and determine the access request as "delegated user access" in response to the first integer in the access request being 1.

According to an embodiment of the sixth aspect, the step to verify the validity of information in the access request in response to receiving the access request further comprises the third device to: in response to determining the access request as "owner access", verify a blacklist to determine whether the public key of the first device is in the blacklist; verify σ via a first verification algorithm, Verify($\sigma_{C,O}$, $PK_O$, $PK_C$), taking as input the signature $\sigma_{C,O}$, the public key of the first device, and the public key of the third device and a second signature verification algorithm, Verify(σ, r, $PK_O$), taking as input the signature σ, the random number r, the public key of the first device; and grant access to the car in response to the output of the first and second signature verification algorithms being 1.

According to an embodiment of the sixth aspect, the step to verify the validity of information in the access request in response to receiving the access request further comprises the third device to: in response to determining the access request as "delegated user access", check a validity of the $P_U$; verify a blacklist to determine whether the public key of the second device is in the blacklist; verify σ via a third signature verification algorithm, Verify($\sigma_{C,O}$, $PK_O$, $PK_C$), taking as input the signature $\sigma_{C,O}$, the public key of the first device, and the public key of the third device, a fourth signature verification algorithm, Verify($\sigma_{O,U}$, $PK_U \| P_U$, $PK_O$), taking as input the signature $\sigma_{O,U}$, the public key of the second device and the policy $PK_U \| P_U$, and the public key of the first device, and a fifth signature verification algorithm, Verify(σ, r, $PK_U$) taking as input the signature σ, the random number r, the public key of the second device; and grant access to the car in response to the output of the third, fourth and fifth signature verification algorithms being 1.

According to an embodiment of the sixth aspect, the method further comprises the third device to: update the blacklist in response to receiving the update blacklist request from the first device.

According to an embodiment of the sixth aspect, the step to update the blacklist comprises the third device to: append the public key of the second device, public key of the device who delegated access to the second device, and the associated access policy $P_U$ on the blacklist.

According to an embodiment of the sixth aspect, the method further comprises a remote server to: receive messages from one of the first, second and third devices; and relay the messages to respective one the first, second and third devices.

A seventh aspect of the disclosure describes a digital signature-based key generation and distribution system for a vehicle access authentication framework comprising: a first device operated by a car owner, a second device operated by a delegated user, and a third device residing in a vehicle. The first device is configured to: execute a key generation algorithm, KeyGen($1^k$), which takes $1^k$ as input security parameter, and outputs a pair of keys ($PK_O$, $SK_O$); transmit $PK_O$ to the third device; access the vehicle by sending an access request comprising $PK_O$ to the third device; and generate a delegated digital certificate $\sigma_{O,U}$ based on a public key generated by the second device in response to receiving a request for delegated digital certificate from the second device.

According to an embodiment of the seventh aspect, the step to access the vehicle by sending the access request containing the digital certificate to the third device comprises the first device to: receive an ID of the third device and a random number, r, from the third device; compute a signature σ via a signing algorithm, Sign($SK_O$, r), taking as input the private key of the first device, $SK_O$ and the random number r, and outputting the signature σ; and transmit the access request containing [0, $PK_O$, σ] to the third device where 0 denotes "owner access".

According to an embodiment of the seventh aspect, the step to generate the delegated digital certificate $\sigma_{O,U}$ comprises the first device to: receive a public key $PK_U$ generated by the third device; determine an access policy $P_U$; and generate the delegated digital certificate $\sigma_{O,U}$, via the signing algorithm, Sign($SK_O$, $PK_U \| P_U$), taking as input the $SK_O$, and the public key of the second device and the access policy $PK_U \| P_U$ and outputting delegated digital certificate $\sigma_{O,U}$; and transmit $PK_O$ and the delegated digital certificate $\sigma_{O,U}$ to the second device.

According to an embodiment of the seventh aspect, the access policy $P_U$ include one or more of validity period, speed limit, and mileage limit.

According to an embodiment of the seventh aspect, the system further comprised the first device to: update a blacklist in the third device.

According to an embodiment of the seventh aspect, the step to update the blacklist in the third device comprises the first device to: generates a revoke request containing an ID of the device to be revoked; and transmit the revoke request to the third device.

According to an embodiment of the seventh aspect, the system further comprises the second device is configured to: request a delegated digital certificate, the request for the second level authentication key comprising the public key generated by the second device; receive the delegated digital certificate from the first device; and access the vehicle by sending an access request containing the delegated digital certificate to the third device.

According to an embodiment of the seventh aspect, the step to request the delegated digital certificate comprises the second device to: execute the key generation algorithm, KeyGen($1^k$), which takes as input security parameter $1^k$, and outputs a pair of keys ($PK_U$, $SK_U$); transmits $PK_U$ to the first device; receive $PK_O$ and the delegated digital certificate, $\sigma_{O,U}$, from the first device; and stores $SK_U$ securely in a secure storage module.

According to an embodiment of the seventh aspect, the step to access the vehicle by sending the access request comprises the second device to: receive an ID of the third device and a random number, r, from the third device; compute a signature σ via the signing algorithm, Sign($SK_U$, r), taking as input the private key of the second device, $SK_U$ and the random number r, and outputting the signature σ; and transmit the access request containing [1, $PK_U$, $P_U$, $\sigma_{O,U}$, $PK_O$, σ] to the third device where 1 denotes "delegated user access".

According to an embodiment of the seventh aspect, the system further comprises the third device to: receive and store $PK_O$ in a whitelist; verify a validity of information in the access request in response to receiving the access request; and unlock the vehicle in response to determining the request for access is valid.

According to an embodiment of the seventh aspect, the step to verify the validity of information in the access request in response to receiving the access request comprises the third device to: broadcast $id_{Car}$ and the random number r.

According to an embodiment of the seventh aspect, the step to verify the validity of information in the access request in response to receiving the access request comprises the third device to: identify whether the access request is "owner access" or "delegated user access" based on the first integer in the access request; determine the access request as "owner access" in response to the first integer in the access request being 0; and determine the access request as "delegated user access" in response to the first integer in the access request being 1.

According to an embodiment of the seventh aspect, the step to verify the validity of information in the access request in response to receiving the access request further comprises the third device to: in response to determining the access request as "owner access", verify the whitelist to determine whether the public key of the first device is in the whitelist; and in response to the public key of the first device being determined to be in the whitelist, verify σ via a first verification algorithm, Verify(σ, r, $PK_O$), taking as input the signature σ, the random number r, the public key of the first device; and grant access to the car in response to the output of the first signature verification algorithm being 1.

According to an embodiment of the seventh aspect, the step to verify the validity of information in the access request in response to receiving the access request further comprises the third device to: in response to determining the access request as "delegated user access", verify the whitelist to determine whether the public key of the first device is in the whitelist, check a validity of the $P_U$, and verify the blacklist to determine whether the public key of the second device is in the blacklist; in response to determining the public key of the first device is in the whitelist, the $P_U$, is valid, and the public key of the second device is not in the blacklist, verify σ via a third signature verification algorithm, Verify($\sigma_{O,U}$, $PK_U$, $PK_O$), taking as input the signature $\sigma_{O,U}$, the public key of the second device, and the public key of the first device, and a fourth signature verification algorithm, Verify(σ, r, $PK_U$) taking as input the signature σ, the random number r, the public key of the first device; and grant access to the car in response to the output of the third and fourth signature verification algorithms being 1.

According to an embodiment of the seventh aspect, the system further comprising the third device configured to: update the blacklist in response to receiving the update blacklist request from the first device.

According to an embodiment of the seventh aspect, the step to update the blacklist comprises the third device to: append the public key of the second device, public key of the device who delegated access to the second device, and the associated access policy $P_U$ on the blacklist.

According to an embodiment of the seventh aspect, the system further comprising a remote server to: receive messages from one of the first, second and third devices; and relay the messages to respective one the first, second and third devices.

An eighth aspect of the disclosure describes a digital signature-based key generation and distribution method for a vehicle access authentication framework comprising: a first device operated by a car owner, a second device operated by a delegated user, and a third device residing in a vehicle. The method comprising the first device to: execute a key generation algorithm, KeyGen($1^k$), which takes $1^k$ as input security parameter, and outputs a pair of keys ($PK_O$, $SK_O$); transmit $PK_O$ to the third device; access the vehicle by sending an access request comprising $PK_O$ to the third device; and generate a delegated digital certificate $\sigma_{O,U}$ based on a public key generated by the second device in response to receiving a request for delegated digital certificate from the second device.

According to an embodiment of the eighth aspect, the step to access the vehicle by sending the access request containing the digital certificate to the third device comprises the first device to: receive an ID of the third device and a random number, r, from the third device; compute a signature σ via a signing algorithm, Sign($SK_O$, r), taking as input the private key of the first device, $SK_O$ and the random number r, and outputting the signature σ; and transmit the access request containing [0, $PK_O$, σ] to the third device where 0 denotes "owner access".

According to an embodiment of the eighth aspect, the step to generate the delegated digital certificate $\sigma_{O,U}$ comprises the first device to: receive a public key $PK_U$ generated by the third device; determine an access policy $P_U$; and generate the delegated digital certificate $\sigma_{O,U}$, via the signing algorithm, Sign($SK_O$, $PK_U\|P_U$), taking as input the $SK_O$, and the public key of the second device and the access policy $PK_U\|P_U$ and outputting delegated digital certificate $\sigma_{O,U}$; and transmit $PK_O$ and the delegated digital certificate $\sigma_{O,U}$ to the second device.

According to an embodiment of the eighth aspect, the access policy $P_U$ include one or more of validity period, speed limit, and mileage limit.

According to an embodiment of the eighth aspect, the first device to: update a blacklist in the third device.

According to an embodiment of the eighth aspect, the step to update the blacklist in the third device comprises the first device to: generates a revoke request containing an ID of the device to be revoked; and transmit the revoke request to the third device.

According to an embodiment of the eighth aspect, the method further comprising the second device to: request a delegated digital certificate, the request for the second level authentication key comprising the public key generated by the second device; receive the delegated digital certificate from the first device; and access the vehicle by sending an access request containing the delegated digital certificate to the third device.

According to an embodiment of the eighth aspect, the step to request the delegated digital certificate comprises the second device to: execute the key generation algorithm, KeyGen($1^k$), which takes as input security parameter $1^k$, and outputs a pair of keys ($PK_U$, $SK_U$); transmit $PK_U$ to the first device; receive $PK_O$ and the delegated digital certificate, $\sigma_{O,U}$, from the first device; and store $SK_U$ securely in a secure storage module.

According to an embodiment of the eighth aspect, the step to access the vehicle by sending the access request comprises the second device to: receive an ID of the third device and a random number, r, from the third device; compute a signature $\sigma$ via the signing algorithm, Sign($SK_U$, r), taking as input the private key of the second device, $SK_U$ and the random number r, and outputting the signature $\sigma$; and transmit the access request containing [1, $PK_U$, $P_U$, $\sigma_{O,U}$, $PK_O$, $\sigma$] to the third device where 1 denotes "delegated user access".

According to an embodiment of the eighth aspect, the method further comprising the third device to: receive and store $PK_O$ in a whitelist; verify a validity of information in the access request in response to receiving the access request; and unlock the vehicle in response to determining the request for access is valid.

According to an embodiment of the eighth aspect, the step to verify the validity of information in the access request in response to receiving the access request comprises the third device to: broadcast $id_{Car}$ and the random number r.

According to an embodiment of the eighth aspect, the step to verify the validity of information in the access request in response to receiving the access request comprises the third device to: identify whether the access request is "owner access" or "delegated user access" based on the first integer in the access request; determine the access request as "owner access" in response to the first integer in the access request being 0; and determine the access request as "delegated user access" in response to the first integer in the access request being 1.

According to an embodiment of the eighth aspect, the step to verify the validity of information in the access request in response to receiving the access request further comprises the third device to: in response to determining the access request as "owner access", verify the whitelist to determine whether the public key of the first device is in the whitelist; and in response to the public key of the first device being determined to be in the whitelist, verify $\sigma$ via a first verification algorithm, Verify($\sigma$, r, $PK_O$), taking as input the signature $\sigma$, the random number r, the public key of the first device; and grant access to the car in response to the output of the first signature verification algorithm being 1.

According to an embodiment of the eighth aspect, the step to verify the validity of information in the access request in response to receiving the access request further comprises the third device to: in response to determining the access request as "delegated user access", verify the whitelist to determine whether the public key of the first device is in the whitelist, check a validity of the $P_U$, and verify the blacklist to determine whether the public key of the second device is in the blacklist; in response to determining the public key of the first device is in the whitelist, the $P_U$ is valid, and the public key of the second device is not in the blacklist, verify $\sigma$ via a third signature verification algorithm, Verify($\sigma_{O,U}$, $PK_U$, $PK_O$), taking as input the signature $\sigma_{O,U}$, the public key of the second device, and the public key of the first device, and a fourth signature verification algorithm, Verify ($\sigma$, r, $PK_U$) taking as input the signature $\sigma$, the random number r, the public key of the first device; and grant access to the car in response to the output of the third and fourth signature verification algorithms being 1.

According to an embodiment of the eighth aspect, the method further comprising the third device to: update the blacklist in response to receiving the update blacklist request from the first device.

According to an embodiment of the eighth aspect, the step to update the blacklist comprises the third device to: append the public key of the second device, public key of the device who delegated access to the second device, and the associated access policy $P_U$ on the blacklist.

According to an embodiment of the eighth aspect, the method further comprising a remote server to: receive messages from one of the first, second and third devices; and relay the messages to respective one the first, second and third devices.

BRIEF DESCRIPTION OF THE DRAWINGS

The above advantages and features in accordance with this invention are described in the following detailed description and are shown in the following drawings:

FIG. 3.2 illustrating a program stored in a memory in the mobile device of a car owner for performing the processes in accordance with an embodiment of this disclosure;

FIG. 3.3 illustrating a program stored in a memory in the mobile device of a delegated user for performing the processes in accordance with an embodiment of this disclosure;

FIG. 3.4 illustrating a program stored in a memory in a remote server for performing the processes in accordance with an embodiment of this disclosure;

DETAILED DESCRIPTION

This disclosure relates to a vehicle access authentication framework. Particularly, this disclosure relates to a method and system for generating and distributing keys among various entities for vehicle access.

This invention relates to a vehicle access system using a portable device-based electronic key system. In the system, users do not obtain physical keys, but use their portable devices such as smart phones to securely access vehicles with the help of electronic access credentials stored on the portable devices. Further, the vehicle owners' access rights can be delegated to other users at the owners' discretion, either temporarily or for long term, or bound to certain access policy.

The targeted applications for this invention are vehicle sharing for family use or fleet management, and the proposed system is especially applicable in scenarios where a highly dynamic or large set of users exist such as in car rental services. The system allows for multiple owners sharing a car, and allows a car owner to flexibly delegate the access right to other people, governed by an access policy stipulated by the car owner.

Figure 1:
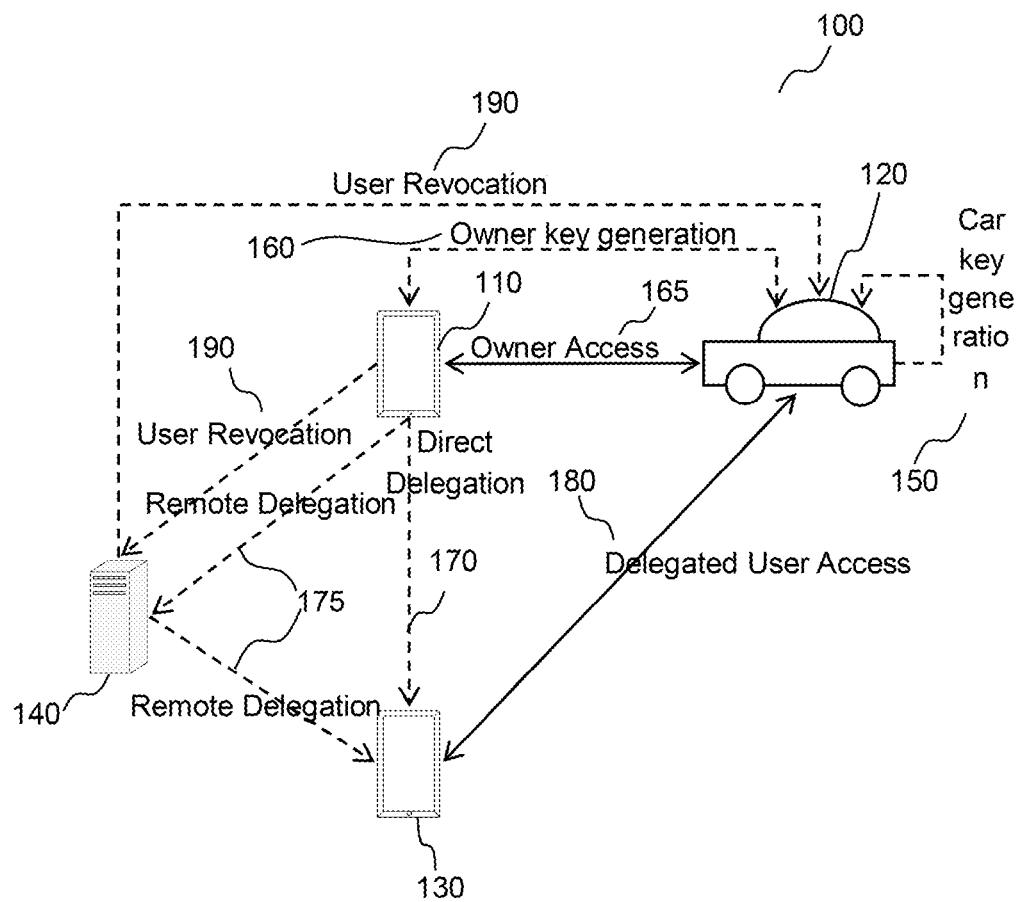
FIG. 1 illustrating the architecture of the system in accordance with an embodiment of this disclosure.

FIG. 1 illustrates the architecture of the system 100. The system 100 includes a mobile device of a car owner 110, processing unit residing in a car 120, mobile device of a delegated user 130, and a remote server 140. One skilled in the art will recognise that the processing unit in the car 120 may also be a mobile device without departing from the system.

The mobile devices and processing unit are communicatively connected via short distance communication such as Bluetooth. The mobile devices and processing unit are communicatively connected to the remote server 140 via a connected network, in particular Internet. For purposes of this disclosure, we will use car owner 110, car 120 and delegated user 130 to describe the processes and interactions executed by the system 100.

It should be noted that the system 100 is designed to allow for multiple car owners, but without loss of generality, we assume a master car owner who takes charge of administrating the car, e.g., manages a blacklist stored on the processing unit residing in the car.

The system 100 consists of the following processes, where the car owner access protocol and the Delegated User access protocol are online processes shown in solid lines in FIG. 1 while the others are offline processes shown in dotted lines in FIG. 1.

Car Key Generation

The car 120 executes a process to generate car key 150. This process is initiated by the car owner in which a secret key (K) will be generated. This is the only secret key (K) securely kept by the car, and all other authentication keys are derivable from this secret key. In particular, the car would generate keys for an owner and the owner may use its key to further generate keys for delegated users.

Car Owner Key Generation

This process 160 is executed between a car owner and the car. As a result, the car issues an authentication key $K_{id_O}$ to the car owner, based on the owner's identity ($id_O$) and optionally an access policy ($P_O$). The authentication key is securely managed on the car owner's portable device 110 such as a mobile device or a secure hardware such as a token. The access policy $P_O$ may, for example, stipulate the validity period of the authentication key.

Owner Access Protocol

This process 165 is essentially an authentication protocol between a car owner 110 and the car 120, where the car owner 110 uses its authentication key $K_{id_O}$ and the car 120 uses its secret key (K). If the car 120 successfully verifies the authenticity of the car owner 110, then the car 120 grants access to the car owner 110. For purposes of this disclosure, granting access may refers to opening the car door and/or powering up the car engine. Otherwise, the car 120 refuses granting access to the car owner 160.

Delegation

This process 170 or 175 is executed between a car owner 110 and a delegated user 130. As a result, the car owner 110 generates a delegated authentication $K_{id_U}$ based on the car owner's ID ($id_O$), the delegated user's ID ($id_U$), and an access policy ($P_U$). The access policy ($P_U$) can be fine-grained, e.g., stipulating the validity period of the delegation, the limit of driving speed, the range within which the car can be drove, and so on. Two ways are distinguished on how the car owner transmits $K_{id_U}$ to the delegated user, namely, (1) direct delegation 170 and remote delegation 175. In direct delegation 170, the car owner directly sends $K_{id_U}$ to the delegate user. This occurs where both car owner and delegated user meet in person and both of them may use their mobile devices to communication directly through short distance communication means such as Near Field Communication (NFC) or bluetooth. In remote delegation 175, the car owner first sends $K_{id_U}$ to the remote server 140, and the delegated user retrieves the key ($K_{id_U}$) from the remote server 140.

Delegated User Access Protocol

This process 180 is essentially an authentication protocol between a mobile device of the delegated user and the processing unit in the car, where the delegated user uses its delegated authentication key $K_{id_U}$ and the car uses its secret key K. If the car successfully verifies the authenticity of the delegated user, then the car grants access to the delegated user according to the policy. Otherwise, the car refuses granting access to the non-authorised user.

User Revocation

This process 190 enables the master car owner to administrate a blacklist maintained at the processing unit 120 in the car by adding an item on the revoked user, through the remote server 140. Both car owners and delegated users can be revoked.

Figure 2:
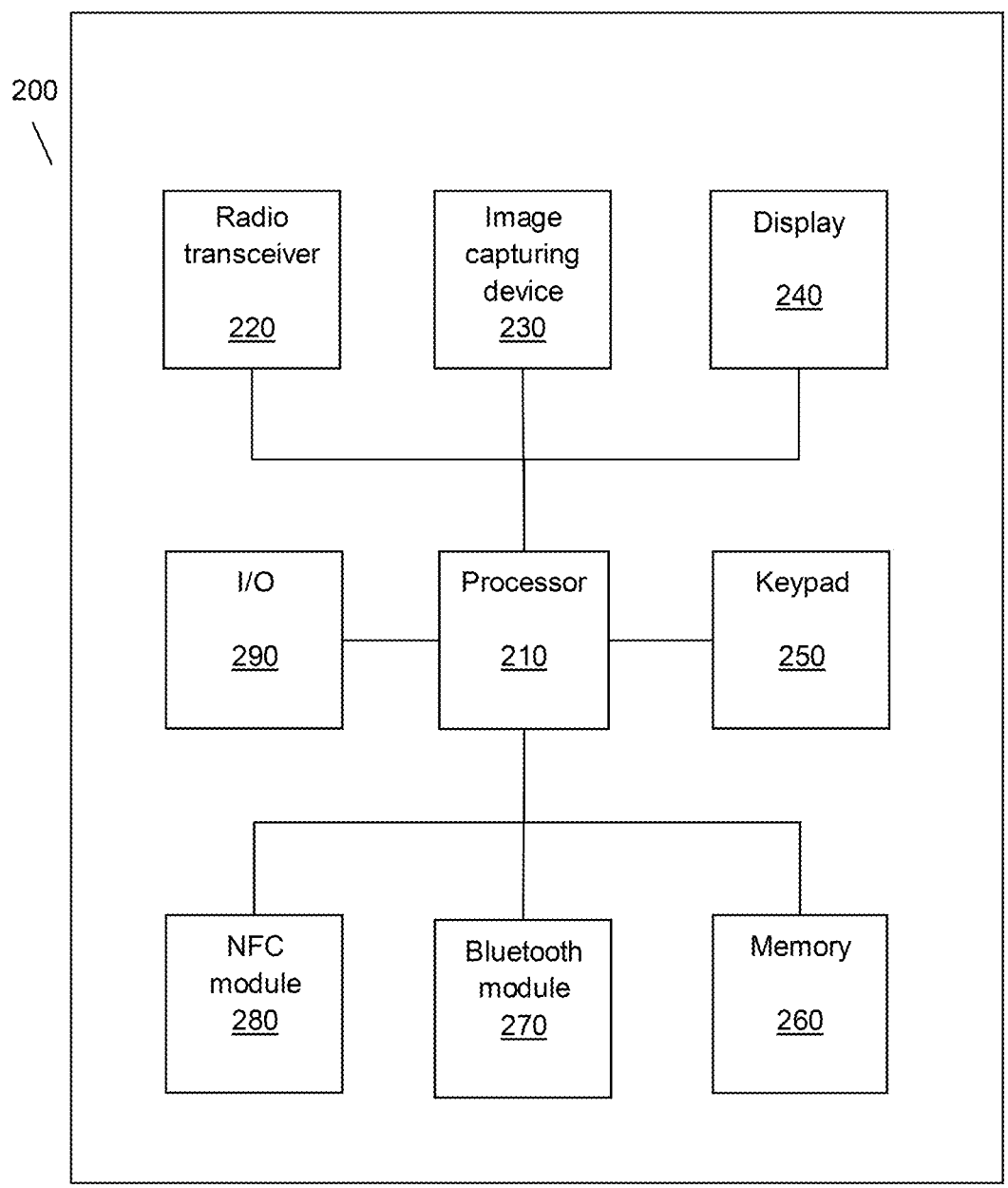
FIG. 2 illustrating an example of a processing system in the processing unit residing in the car or the mobile devices of car owners or delegated users that perform processes in accordance with an embodiment of this disclosure FIG. 3.1 illustrating a program stored in a memory in the processing unit residing in the car for performing the processes in accordance with an embodiment of this disclosure.

FIG. 2 illustrates an example of a processing system 200 in the processing unit 120 residing in the car or the mobile devices 110 and 130 of the car owner or delegated user. Processing system 200 represents the processing systems in the processing unit 120 residing in the car or the mobile devices 110 and 130 of the car owner or delegated user that execute instructions to perform the processes described below in accordance with embodiments of this invention. One skilled in the art will recognize that the instructions may be stored and/or performed as hardware, firmware, or software without departing from this invention. Further, one skilled in the art will recognize that the exact configuration of each processing system may be different and the exact configuration of the processing system executing processes in accordance with this invention may vary and processing system 200 shown in FIG. 2 is provided by way of example only.

Processing system 200 includes a processor 210, a radio transceiver 220, an image capturing device 230, a display 240, a keypad 250, a memory 260, a Bluetooth module 270, a Near Field Communication (NFC) module 280, and an I/O device 290.

The radio transceiver 220, image capturing device 230, display 240, keypad 250, memory 260, Bluetooth module 270, NFC module 280, I/O device 290 and any number of other peripheral devices connect to processor 210 to exchange data with processor 210 for use in applications being executed by processor 210.

The radio transceiver 220 is connected to an antenna which is configured to transmit outgoing voice and data signals and receive incoming voice and data signals over a radio communication channel. The radio communication channel can be a digital radio communication channel such as a CDMA, GSM or LTE channels that employs both voice and data messages in a conventional techniques.

The image capturing device 230 is any device capable of capturing still and/or moving images such as complementary metal-oxide semiconductor (CMOS) or charge-coupled sensor (CCD) type cameras. The display 240 receives display data from processor 210 and display images on a screen for a user to see. The display 240 may be a liquid crystal display (LCD) or organic light-emitting diode (OLED) display. The keypad 250 receives user input and transmits the input to processor 210. In some embodiments, the display 240 may be a touch sensitive surface that functions as a keypad to receive user input.

The memory 260 is a device that transmits and receives data to and from processor 210 for storing data to a memory. The Bluetooth module 270 is a module that allows processing unit 110 to establish communication with another similar device based on Bluetooth technology standard. The NFC module 280 is a module that allows processing unit 110 to establish radio communication with another similar device by touching them together or by bringing the devices within a close proximity.

Other peripheral devices that may be connected to processor 210 include a Wi-Fi transceiver, a Global Positioning System (GPS), a RFID transceiver, an ultra wideband transceiver and other positioning transceivers.

The processor 210 is a processor, microprocessor, or any combination of processors and microprocessors that execute instructions to perform the processes in accordance with the present disclosure. The processor has the capability to execute various application programs that are stored in the memory 260. These application programs can receive inputs from the user via the display 240 having a touch sensitive surface or directly from a keypad 250. Some application programs stored in the memory 260 that can be performed by the processor 210 are application programs developed for Android, IOS, Windows Mobile, Blackberry or other mobile platforms.

The remote server 140 is essentially a computing system or a virtual machine running on the computing system that is communicatively connected to the processing unit 120 residing in the car or the mobile devices 110 and 130 of the car owner or delegated user. The remote server 140 is able to receive and transmit information such that the processing unit 120 residing in the car or the mobile devices 110 and 130 of the car owner or delegated user are able to communicate with each other. The remote server is similar to the processing system 200 in that the remote server also includes a processor 210, a display 240, a keypad 250, a memory 260, and an I/O device 290. The remote server should also include a network device that connects the remote server to a network for transmission of data to and from other processing systems such as the processing unit 120 residing in the car or the mobile devices 110 and 130 of the car owner or delegated user.

FIG. 3.1 illustrates a program 3100 stored in memory in processing unit residing in the car for performing the processes in accordance with the present disclosure. Program 3100 includes a Key Generation Module 3110, a Secure Storage module 3120, an Owner Key Generation module 3130, a Car Access Protocol module 3140 and a Blacklist module 3150. Briefly, the processes executed by 5 modules are as follows:

1) Key Generation Module 3110 implements the car's key generation process 150 initiated by the master car owner 110.
2) Secure Storage module 3120 manages generated secret key.
3) Owner Key Generation module 3130 implements the car owner's key generation process 160 initiated by the car owner 110.
4) Car Access Protocol module 3140 implements the owner access protocol 165 and the delegated user access protocol 180 initiated by either the car owner 110 or delegated user 130.
5) Blacklist module 3150 manages the blacklist containing revoked IDs.

FIG. 3.2 illustrates a program 3200 stored in a memory in the mobile device of a car owner for performing the processes in accordance with the present disclosure. Program 3200 includes an Owner Key Generation module 3210, a Secure Storage module 3220, a Delegated User Key Generation module 3230, a Car Access Protocol module 3140 and a Blacklist administration module 3250. Briefly, the processes executed by 5 modules are as follows:

1) Owner Key Generation module 3210 implements the Owner's key generation process 160
2) Secure storage module 3220 manages the generated secret key
3) Delegated User Key Generation module 3230 implements the delegation of access rights process 170 and 175.
4) Car access protocol module 3240 implements the car owner access protocol 165.
5) Blacklist administration module 3250 enables the master car owner to administrate the blacklist containing revoked IDs (only master car owner has the Blacklist administration module).

FIG. 3.3 illustrates a program 3300 stored in memory in the mobile device of a delegated user for performing the processes in accordance with the present disclosure. Program 3300 includes a Delegated user Key Generation module 3310, a Secure Storage module 3320, and a Car Access Protocol module 3330. Briefly, the processes executed by 3 modules are as follows:

1) Delegated user Key Generation module 3310 implements the delegation of access rights process 170 and 175
2) Secure storage module 3320 manages the generated secret key.
3) Car access protocol module 3330 implements the delegated user access protocol 180.

FIG. 3.4 illustrates a program 3400 stored in memory in the remote server for performing the processes in accordance with the present disclosure. Program 3400 includes a Delegated user Key Generation module 3410, and a Blacklist administration module 3420. Briefly, the processes executed by 2 modules are as follows:

1) Delegated user Key Generation module 3410 implements the remote delivery scheme of the delegation of access right 175.
2) Blacklist administration module 3420 implements the user revocation process 190 to allow the master car owner to administer the blacklist containing revoked IDs.

The following first embodiment presents a symmetric key based instantiation of the above processes, based on the idea of hierarchical identity-based key generation.

Figure 4:
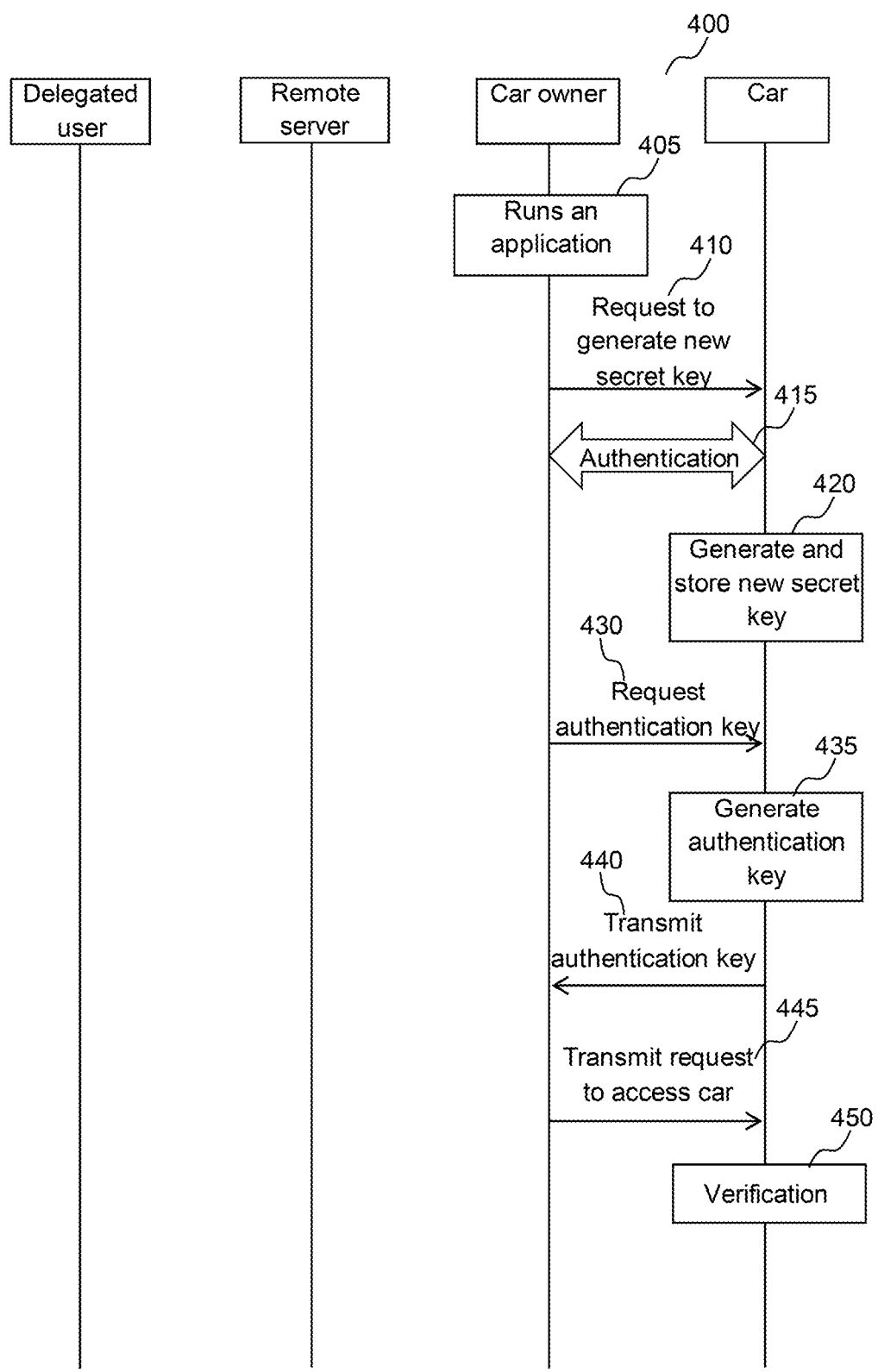
FIG. 4 illustrating a timing diagram to illustrate the information flow between the car, car owner, delegated user and remote server in accordance with an embodiment of this disclosure.

FIG. 4 illustrates a timing diagram 400 to illustrate the information flow between the car, car owner, delegated user and remote server.

A key generation Application is installed on the car and only the master car owner can initiate the key generation Application, which is governed by password such as a superuser password. The superuser password can be delivered to the master car owner in a sealed physical envelope, together with other documents related to the car. The master car owner should be allowed to change the password. When the car is resold, the new master car owner can run the key generation Application again to generate a new secret key, which will overwrite the old one. The process of generating the new secret key is as follows.

Timing diagram 400 begins with step 405 where the car owner runs an application on his mobile device to initiate the car to run the key generation module 3110 to generate a new secret key. Particularly, the owner key generation module 3210 would generate and transmit a request to generate new secret key to the key generation module 3110 in step 410. In response to receiving the request, the car would perform an authentication with the car owner in step 415. In particular, the key generation module 3110 would request the owner key generation module 3210 for the superuser password. If authentication is successful, the key generation module 3110 would generate a secret key (K) in step 420. Otherwise, the car would not generate a secret key. The car manages the secret key securely in the secure storage module 3120, e.g., in a secure hardware.

After the secret key is generated, the car owner would request for an authentication key in order to access the car. The authentication key for the car owner is generated in the following manner. In step 430, the owner key generation module 3210 sends a request to the owner key generation module 3130 for authentication key. The request includes the car owner's ID ($id_O$). In response to receiving the request from the car owner, the owner key generation module 3130 generates an authentication key $K_{id_O}$=h(K, $id_{Car}$, $id_O$) in step 435, where h(.) is a cryptographic hash function, $id_{Car}$ is the ID of the car. The authentication key is transmitted to the owner key generation module 3210 in step 440. The car owner's mobile device manages the authentication key securely in the secure storage module 3220, e.g., in a secure hardware. For added security, a key rotation strategy can be implemented where after each car access or a fixed number of car accesses, the car generates a new authentication key for the car owner. Under the key rotation strategy, $K_{id_O}$ would be computed as =h(K, $id_{Car}$, $id_O$, Seq), where Seq is an integer value, initially set to be 0.

After the car owner received the authentication key, he/she is able to access the car with the authentication key. The process of accessing the car is as follows. The car access protocol module 3140 would trigger the NFC to broadcasts its ID $id_{Car}$ and a random number r in a fixed frequency. Based on the $id_{Car}$ and random number r, the car access protocol module 3240 computes vd=MAC($K_{id_O}$, r), and then sends a request to access the car in step 445. The request includes [0, $id_O$, vd] where 0 denotes "owner access". In step 450, the car verifies the blacklist and vd. In particular, the car access protocol module 3140 checks the blacklist to determine whether $id_O$ is revoked, and aborts if it is. If the $id_O$ is not in the blacklist, the car access protocol module 3140 continues to check whether vd=MAC(h(K, $id_{Car}$, $id_O$), r). If the check passes, then the car access protocol module 3140 grants the access, e.g., open the car door. Otherwise, the car access protocol module 3140 rejects granting access. If the key rotation strategy is implemented, a new key is going to be generated for the car owner after each access. Alternatively, the new key can be generated after a certain number of accesses. Further details on the car owner access would be described below.

In another embodiment where the communication channel between the car owner and the car is not that short, i.e. over Bluetooth, steps 445-450 may be modified as follows. The car access protocol module 3140 would broadcasts its ID $id_{Car}$ and a random number r in a fixed frequency, e.g., once every 2 seconds. Upon receiving the broadcast message, the car access protocol module 3240 chooses a random number $r_1$, and then sends a message containing [0, $id_O$, $r_1$] to the car, where 0 denotes "owner access". In response to receiving the message, the car access protocol module 3140 first checks the blacklist to determine whether $id_O$ is revoked, and aborts if it is. Otherwise, the car access protocol module 3140 computes $K'_{id_O}$=h(K, $id_{Car}$, $id_O$) and $vd_1$=MAC($K'_{id_O}$, $r_1$, r) and transmits $vd_1$ to the car owner. In response to receiving the message, the car access protocol module 3240 checks whether $vd_1$ is equal to MAC($K_{id_O}$, $r_1$, r), and aborts if the check fails. Otherwise, the car access protocol module 3240 computes $vd_2$=MAC($K_{id_O}$, r) and transmits a message containing $vd_2$ to the car access protocol module 3140. In response to receiving the message, the car access protocol module 3140 checks whether $vd_2$ is equal to MAC($K'_{id_O}$, r), and if the check passes, the car access protocol module 3140 grants the access to the car, e.g., open the car door. Otherwise, the car access protocol module 3140 rejects granting access to the car.

After the car owner received the authentication key, he/she is able to delegate access to the car with the authentication key. The process of delegation of access rights is as follows. The delegated user key generation module 3310 transmits his/her ID $id_U$ to the delegated user key generation module 3230 in step 460. In response to receiving the ID, the delegated user key generation module 3230 determines an access policy $P_U$, and generates a delegated authentication key $K_{id_U}$=h($K_{id_O}$, $id_U$, $P_U$) in step 465. Thereafter, the delegated user key generation module 3230 transmits the delegated authentication key to the delegated user key generation module 3310 via either direct delivery or remote delivery in step 470.

After the delegated user received the delegated authentication key, he/she is able to access the car with the delegated authentication key. The process of accessing the car is as follows. The car access protocol module 3140 would trigger the NFC to broadcasts its ID $id_{Car}$ and a random number r in a fixed frequency. Based on the $id_{Car}$ and random number r, the car access protocol module 3330 computes vd=MAC($K_{id_U}$, r), and then sends a request to access the car in step 480. The request includes [1, $id_U$, $id_O$, $P_U$, vd] where 1 denotes "delegated user access". In step 485, the car access protocol module 3140 verifies the $P_U$, blacklist and vd. In particular, upon receipt of the message, the car access protocol module 3140 first checks whether $P_U$ is still valid, and aborts if $P_U$ does not hold any more. Otherwise, the car access protocol module 3140 checks the blacklist in the blacklist module 3150 to determine whether $id_O$ or $id_U$ is revoked, and aborts if it is. Otherwise, the car access protocol module 3140 continues to check whether vd is equal to MAC(h(h(K, $id_{Car}$, $id_O$), $id_U$, $P_U$), r). If the check passes, then the car access protocol module 3140 grants the access, e.g., open the car door. Otherwise, the car access protocol module 3140 rejects granting access.

The master car owner can revoke a car owner or a delegated user from accessing the car by adding the ID of the car owner and delegated user in the blacklist. For revoking a car owner, the blacklist module 3250 transmits a revoke request containing ID of the car owner to the remote server or directly to the car. For revoking a delegated user, the blacklist module 3250 transmits a revoke request containing ID of the delegated user, ID of the car owner who delegated the ID, and the associated access policy P to the blacklist module 3420 of the remote server or directly to the blacklist module 3150 of the car. The master car owner can directly administer the blacklist in the blacklist module 3150 if an operational interface is provided within the car and the master car owner physically has access to the car. Under such scenario, the master car owner can transmit the revoke request directly to the blacklist module 3150 of the car in step 490. In an alternate scenario, the master car owner manages the blacklist via the remote server. In such a scenario, the master car owner transmits the revoke request to the blacklist module 3420 of the remote server in step 495. In response to receiving the revoke request, the blacklist module 3420 of the remote server updates the blacklist associated to the ID of the master car owner. The car would synchronize its blacklist with the remote server soonest possible. When the car request to synchronise its blacklist with the remote server, the remote server sends the updated blacklist to the car in step 498. In this scenario, it is assumed that the master car owner registers to the remote server and thus has an account with the remote server. In addition, the car also registers to the remote server and communicates with the server. Timing diagram ends after step 498.

The processes performed by the mobile devices and processing unit of the car owner, delegated user, car and remote server would now be described below.

Figure 5:
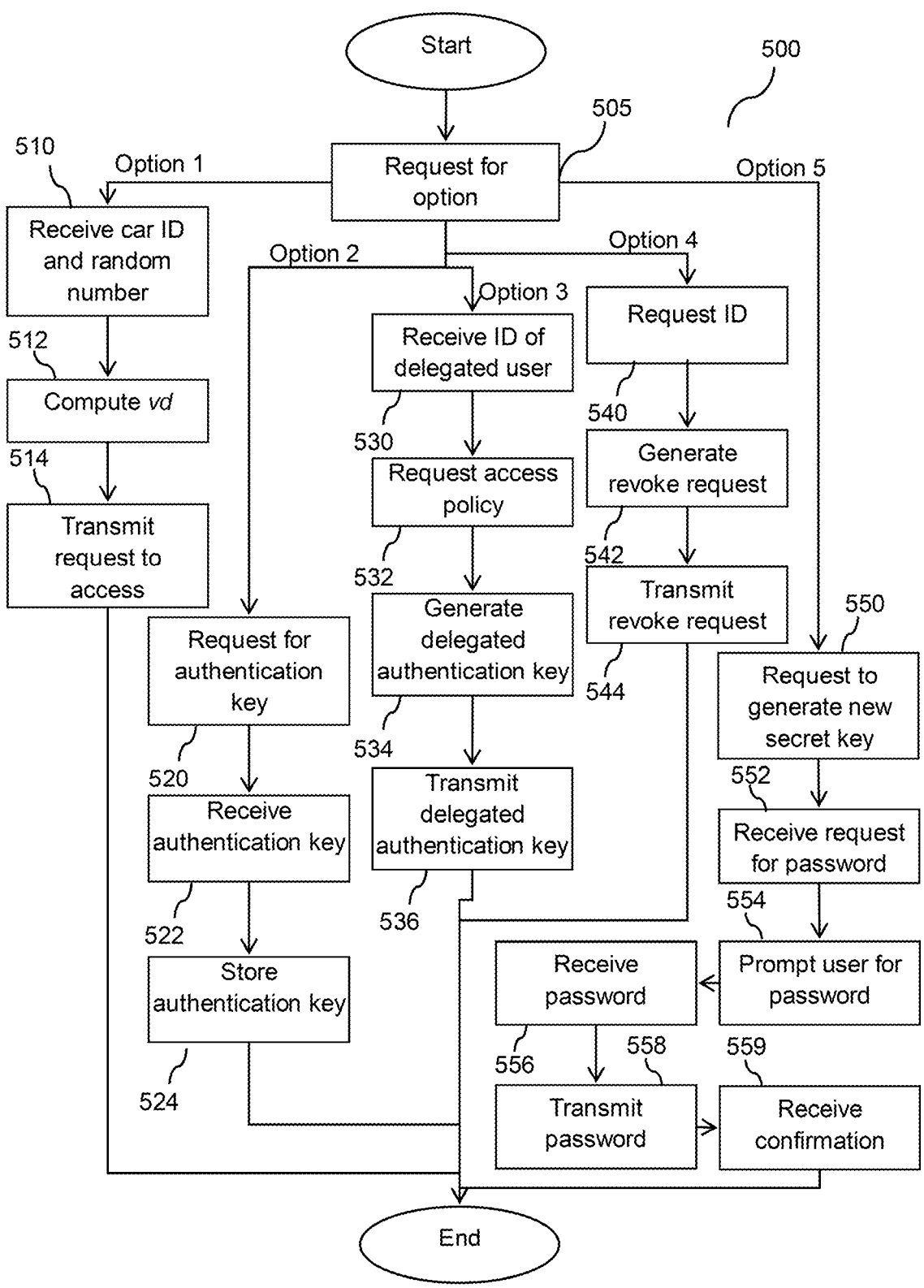
FIG. 5 illustrating a process performed by the mobile device of the master car owner in accordance with an embodiment of this disclosure.

FIG. 5 illustrates a process 500 performed by the mobile device of the master car owner in accordance with this disclosure. Process 500 begins with step 505 by requesting for the car owner to select an option. The options available are (1) access car, (2) add car owner, (3) new delegated user, (4) revoke key, and (5) new setup. If the option selected is option (1), process 500 proceeds to step 510 which is executed by the car access protocol 3240; if the option selected is option (2), process 500 proceeds to step 520 which is executed for the owner key generation module 3210; if the option selected is option (3), process 500 proceeds to step 530 which is executed for the delegated user key generation module 3230; if the option selected is option (4), process 500 proceeds to step 540 which is executed for the blacklist module 3250; and if the option selected is option (5), process 500 proceeds to step 550 which is executed for the owner key generation module 3210.

In step 510, process 500 receives $id_{Car}$ and a random number r in a predetermined frequency via NFC. Based on the $id_{Car}$ and random number r, process 500 retrieves its authentication key $K_{id_O}$ and computes vd=MAC($K_{id_O}$, r) in step 512. vd is computed via a Message Authentication Code (MAC) using a MAC generation function with $K_{id_O}$ and r as the input. After vd is computed, process 500 generates and transmits a request to access the car in step 512. The request includes [0, $id_O$, vd] where 0 denotes "owner access". With the correct information in the request, the car should grant access. Optionally, for added security, a key rotation strategy can be implemented where after each car access or a fixed number of car accesses, the car generates a new authentication key for the car owner. Under the key rotation strategy, process 500 would continue after step 514 by receiving $K_O$ from the processing unit residing in the car. $K_O$ is essentially authenticated encryption of new key $K'_{id_O}$ using the previous key $K_{id_O}$, i.e. $K_O$=AEnc($K_{id_O}$, $K'_{id_O}$). Process 500 would decrypt $K_O$ to get and verify the new key $K'_{id_O}$. If the new $K'_{id_O}$ is authentic, process 500 updates its new authentication key, i.e. $K_{id_O}$=$K'_{id_O}$. If $K'_{id_O}$ is not authentic, process 500 generates and transmits a response res=MAC($K_{id_O}$, FALSE, r) to the car. res is computed via a Message Authentication Code (MAC) using a MAC generation function with $K_{id_O}$, FALSE and r as the input.

In step 520, process 500 generates and transmits a request for authentication key. The request includes the car owner's ID ($id_O$). In step 522, process 500 receives an authentication key $K_{id_O}$=h(K, $id_{Car}$, $id_O$), where h(.) is a cryptographic hash function, $id_{Car}$ is the ID of the car. Process 500 then stores the authentication key in a secured memory in step 524. Optionally, for added security, a key rotation strategy can be implemented where after each car access or a fixed number of car accesses, the car generates a new authentication key for the car owner. Under the key rotation strategy, the authentication key would be $K_{id_O}$=h(K, $id_{Car}$, $id_O$, Seq), where Seq is an integer value initially set to be 0.

In step 530, process 500 receives an ID of a delegated user $id_U$. In response to receiving the ID, process 500 requests for input on the access policy $P_U$ in step 532. The access policy may include validity period of the delegated authentication key. Other access policy that may be added comprises speed limit, mileage, etc. In step 534, process 500 generates a delegated authentication key $K_{id_U}$=h($K_{id_O}$, $id_U$, $P_U$) after receiving the access policy. Thereafter, process 500 transmits the delegated authentication key to the delegated user via either direct delivery or remote delivery in step 536.

In step 540, process 500 request ID of the car owner or delegated user to be revoked. If the user wishes to revoke a car owner, process 500 generates a revoke request containing ID of the car owner in step 542. If the master car owner wishes to revoke a delegated user, process 500 generates a revoke request containing ID of the delegated user, ID of the car owner who delegated the ID, and the associated access policy P in step 542 instead. Depending on the connectivity, process 500 transmits the revoke request directly to the processing unit residing in the car if the mobile device of the master car owner is communicatively connected to the processing unit residing in the car via Bluetooth or NFC in step 544. Alternatively, process 500 transmits the revoke request to the remote server in step 544 instead.

In step 550, process 500 generates and transmits a request to the processing unit residing in the car to generate new secret key. In step 552, process 500 receives a request from the processing unit residing in the car owner for the superuser password. In response to receiving the request, process 500 prompts the user to enter the superuser password in step 554. In step 556, process 500 receives the input from the user. In step 558, process 500 generates and transmits the superuser password to the processing unit residing in the car. In step 559, process 500 receives a confirmation message from the processing unit residing in the car. The confirmation message contains information on whether the secret key has been successfully created.

Process 500 ends after steps 514, 524, 536, 544 and 559. Process 500 is also applicable for the mobile device of a car owner except that in option 4, it would only be able to revoke a delegated user.

Figure 6:
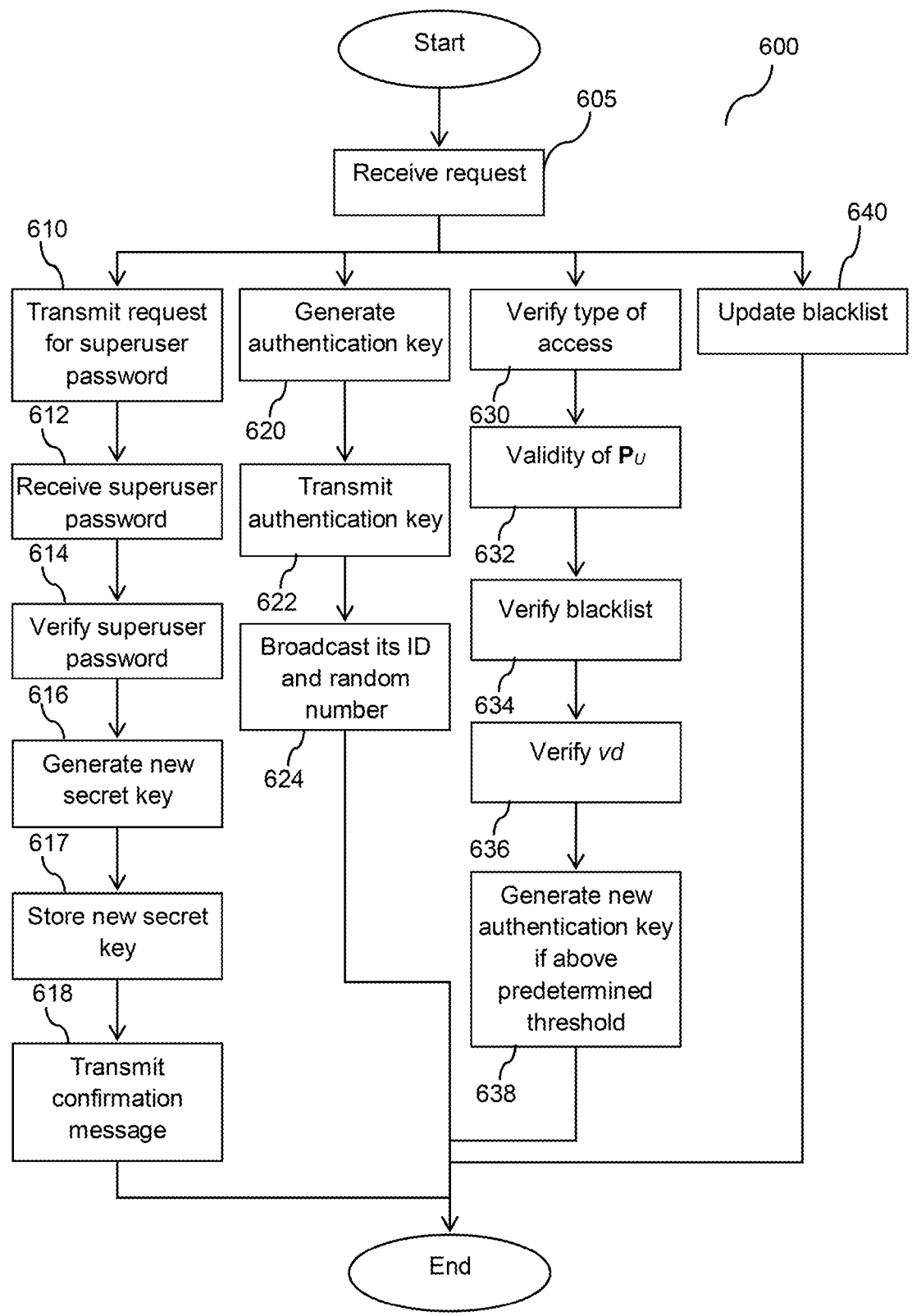
FIG. 6 illustrating a process performed by the processing unit residing in the car in accordance with an embodiment of this disclosure.

FIG. 6 illustrates a process 600 performed by the processing unit residing in the car in accordance with this disclosure. Before beginning with process 600, the processing unit residing in the car has to boot up and retrieve a blacklist associated to the ID of the car from the remote server. Process 600 begins with step 605 to receive a request. If the request is for generating a new secret key, process 600 proceeds to step 610 which is executed by the key generation module 3110; if the request is for generating an authentication key, process 600 proceeds to step 620 which is executed by the owner key generation module 3130; if the request is for accessing the car, process 600 proceeds to step 630 which is executed by the car access protocol 3140; and if the request for updating the blacklist, process 600 proceeds to step 640 which is executed by the blacklist module 3150.

In step 610, process 600 transmits a request for the superuser password. In step 612, process 600 receives the superuser password from the mobile device of the master car owner. In step 614, process 600 verifies the superuser password with the password stored on its memory. If the superuser password is correct, the car would generate a secret key (K) in step 616. Otherwise, the car would not generate a secret key. In step 617, process 600 stores the new secret key securely in a secured hardware. In step 618, process 600 transmits a confirmation message to the mobile device of the master car owner. The confirmation message contains information on whether the secret key has been successfully created. The communication channel between the mobile device and the processing unit residing in the car is secured. This assumption is justified because this process is expected to be executed by the mobile device of the master car owner in a private environment, e.g., in the car owner's garage, and the distance between the mobile device and the processing unit is quite near via either NFC or Bluetooth.

In step 620, process 600 generates an authentication key $K_{id_O}=h(K, id_{Car}, id_O)$ with the car owner's ID ($id_O$), the new secret key and its ID ($id_{Car}$), where h(.) is a cryptographic hash function. In step 622, the authentication key is transmitted to the mobile device of the car owner. For added security, a key rotation strategy can be implemented where after each car access or a fixed number of car accesses, the car generates a new authentication key for the car owner. Under the key rotation strategy, $K_{id_O}$ would be computed as $=h(K, id_{Car}, id_O, Seq)$, where Seq is an integer value, initially set to be 0. In step 624, process 600 would be broadcasting its ID $id_{Car}$ and a random number r in a fixed frequency via either NFC or Bluetooth. One skilled in the art will recognise that process 600 may first be broadcasting its ID $id_{Car}$ and a random number r in a fixed frequency via either NFC or Bluetooth any time after step 624 and before step 630 without departing from the disclosure.

In step 630, process 600 identifies whether this is an "owner access" or "delegated user access" based on the first integer in the request. If the first integer in the request is 0, process 600 determines that this is an "owner access" proceeds to step 634. If the first integer in the request is 1, process 600 determines that this is a "delegated user access" and proceeds to step 632.

In step 632, process 600 checks whether $P_U$ is still valid, and aborts if $P_U$ does not hold any more. If $P_U$ is still valid, process 600 proceeds to step 634. $P_U$ contains the validity period.

In step 634, process 600 verifies the blacklist to determine whether $id_O$ or $id_U$ is revoked. If the $id_O$ or $id_U$ is revoked, process 600 ends. If the $id_O$ or $id_U$ is not in the blacklist, the car continues to verify vd in step 636. For "owner access", process 600 check whether $vd=MAC(h(K, id_{Car}, id_O), r)$. For "delegated user access", process 600 checks whether $vd=MAC(h(h(K, id_{Car}, id_O), id_U, P_U), r)$. If the check passes, process 600 grants access to the car, e.g., open the car door. If the check fails, process 600 rejects granting access.

If the key rotation strategy is implemented, a new authentication key is going to be generated and transmitted to mobile device of the car owner in step 638. The new authentication key is generated in the following manner. The process updates Seq=Seq+1 and computes a new key $K'_{id_O}=h(K, id_{Car}, id_O, Seq)$ and encrypts the new key $K'_{id_O}$ with the car owner's old key $K_{id_O}$ under an authenticated encryption scheme $K_O=AEnc(K_{id_O}, K'_{id_O})$ and sends $K_O$ to the mobile device of the car owner. If a response is subsequently received by the processing unit, the processing unit verifies res. The response comprises $MAC(K'_{id_O}, FALSE, r)$. To verify the res, the processing unit generates a MAC using the same MAC generation function with $K'_{id_O}$, FALSE and r as the input, and see whether MAC is equal to res. If verification is successful, the processing unit computes Seq=Seq-1.

One skilled in the art will recognise that steps 630-638 may be rearranged such that vd is verified first prior to verifying the blacklist. Further, other permutation may be implemented without departing from the disclosure. Still further, steps 630-638 may be implemented in a single step without departing from the disclosure.

Steps 630-638 are based on NFC communication channel between the car owner or delegated user and the car. In another embodiment where the communication channel between the car owner and the car is not that short, i.e. over Bluetooth, steps 630-638 may be performed in the following manner instead. Process 600 receives a message containing [0, $id_O$, $r_1$] from the car owner, where 0 denotes "owner access". Upon receipt of the message, process 600 checks the blacklist to determine whether $id_O$ is revoked, and aborts if it is. Otherwise, process 500 computes $K'_{id_O}=h(K, id_{Car}, id_O)$ and $vd_1=MAC(K'_{id_O}, r_1, r)$ and transmits $vd_1$ to the car owner. Process 600 then receives a message containing $vd_2$ from the car owner where $vd_2=MAC(K_{id_O}, r)$. Upon receiving the message, process 600 checks whether $vd_2$ is equal to $MAC(K'_{id_O}, r)$, and if the check passes, process 600 grants access to the car, e.g., open the car door. Otherwise process 600 rejects granting access.

In step 640, process 600 updates the blacklist accordingly. In particular, process 600 updates the blacklist by appending the ID of the car owner or ID of the delegated user, ID of the car owner who delegated access to the delegated user, and the associated access policy $P_U$.

Figure 7:
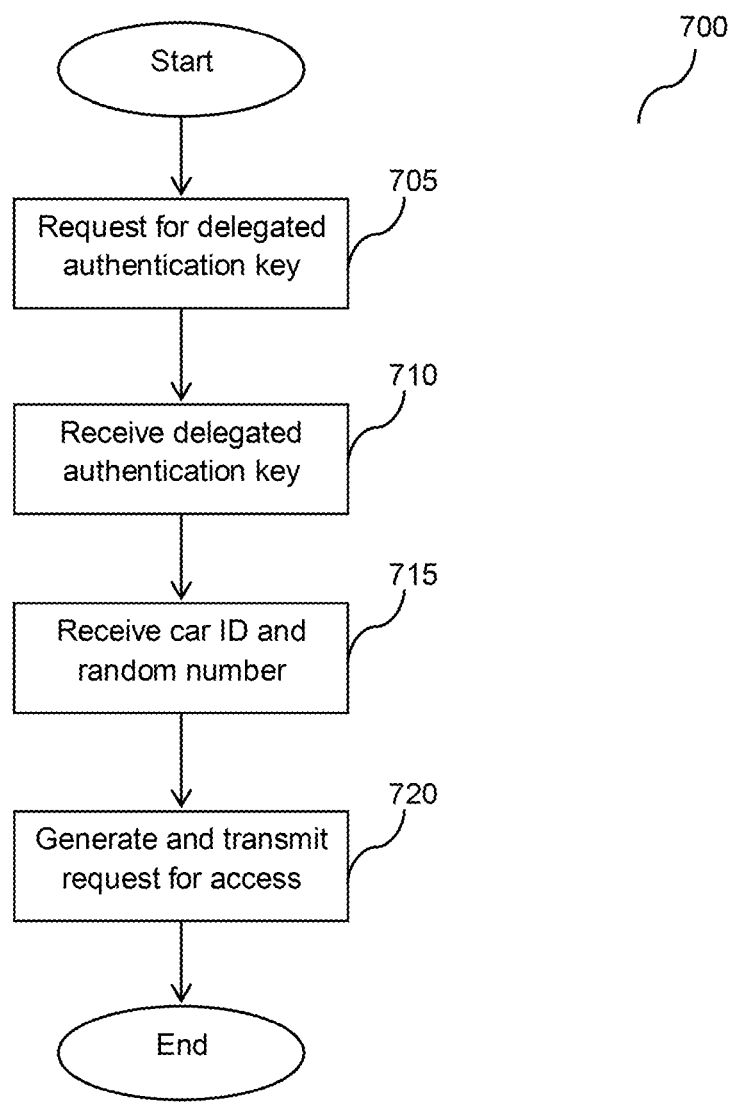
FIG. 7 illustrating a process performed by the mobile device of the delegated user in accordance with an embodiment of this disclosure.

FIG. 7 illustrates a process 700 performed by the mobile device of the delegated user in accordance with this disclosure. Process 700 begins with step 705 by requesting for a delegated authentication key. The request includes his/her ID $id_U$. As mentioned above, the request for delegated authentication key may be via direct delivery or remote delivery. Hence, under direct delivery the request would be transmitted to the mobile device of the car owner via Bluetooth or NFC and no authentication is required. Under the remote delivery, the request for delegated authentication key is transmitted to the remote server in step 605. In the remote delivery scheme, prior to step 705, the mobile device of the delegated user has to first register with the remote server and setup an authentication password for subsequent login to request for delegated authentication key from a car owner. After the delegated user registers with the remote server, he/she can establish a connection with the remote server through a password authentication and transmits the request to the remote server. In the remote delivery, the request would also include the car ID or the car owner ID in order for the remote server to direct the request to the right user.

In step 710, process 700 receives a delegated authentication key $K_{id_U}=(K_{id_O}, id_U, P_U)$. Under direct delivery, the delegated authentication key would be received from the mobile device of the car owner via Bluetooth or NFC. Under the remote delivery, the request for delegated authentication key would be received from the remote server. Steps 705-710 are executable by the delegated user key generation module 3310.

After the delegated user received the delegated authentication key, he/she is able to access the car with the delegated authentication key. To access the car, process 700 receives the car ID $id_{Car}$ and a random number r in a fixed frequency via either NFC or Bluetooth in step 715. Based on the $id_{Car}$ and random number r, the delegated user computes vd=MAC($K_{id_U}$, r), and then transmits a request to access the car in step 720. vd is computed via a Message Authentication Code (MAC) using a MAC generation function with $K_{id_U}$ and r as the input. The request includes [1, $id_U$, $id_O$, $P_U$, vd] where 1 denotes "delegated user access". With the correct request, the car should grant access to the car by opening the car door. Otherwise, the car would reject granting access. Process 700 ends after step 720. Steps 715-720 are executable by the car access protocol module 3330.

Figure 8:
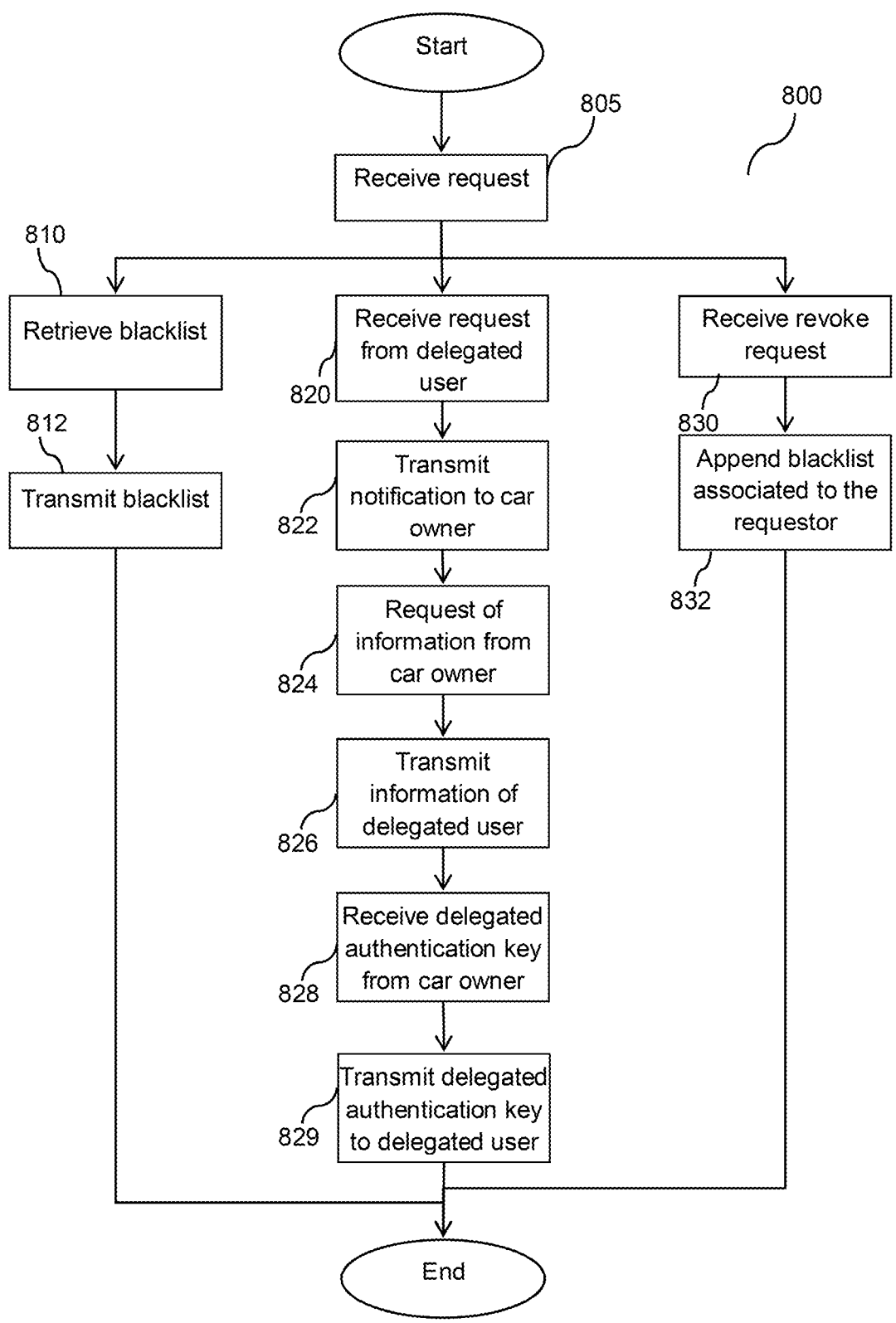
FIG. 8 illustrating a process performed by the remote server in accordance with an embodiment of this disclosure.

FIG. 8 illustrates a process 800 performed by the remote server in accordance with this disclosure. Process 800 begins with step 805 by receiving a request from either the processing unit residing in the car or mobile devices of either car owners or delegated users. If the request is from the processing unit residing in the car to update blacklist, process 800 proceeds to step 810 which is executed by the blacklist module 3420. If the request is from the mobile device of the car owners and delegated user for remote delivery of delegated authentication key, process 800 proceeds to step 820 which is executed by the delegated user key generation module 3410. If the request is from the mobile device of the car owner to revoke a user, process 800 proceeds to step 830 which is executed by the blacklist module 3420.

In step 810, process 800 retrieves the blacklist associated to the car ID upon receiving a request for blacklist from the processing unit residing in the car. The request includes the car ID and/or the ID of the car owner. In step 812, process 800 transmits the blacklist to the processing unit residing in the car.

Step 820 involves handling the remote delivery of delegated authentication key between the delegated user and the car owner. In the remote delivery scheme, prior to step 820, the mobile devices of the delegated user and car owner have to be registered with the remote server and subsequently login with their respective password in order to transmit data to and receive data from the remote server. In step 820, process 700 receives a request from the delegated user comprising its ID together with the car ID or the car owner ID. In response to receiving the request, the remote server transmits a notification to the car owner in step 822. Upon receiving the notification from the remote server, the car owner would login to the remote server and request for information. Hence, in step 824, process 800 receives a request of information from the car owner. In response to receiving the request for information, process 800 generates and transmits information pertaining to the delegated user in step 826. The information may include, name of the delegated user and ID of the delegated user. In step 828, process 800 receives the delegated authentication key from the car owner. In step 829, process 800 transmits the delegated authentication key from the delegated user.

Step 830 involves a request to revoke a user from is the mobile device of the car owner. In step 830, receives a revoke request from the mobile device of the car owner. If a master car owner wishes to revoke a car owner, the revoke request contains ID of the car owner in step 830. If the car owner wishes to revoke a delegated user, the revoke request contains ID of the delegated user, ID of the car owner who delegated the ID, and the associated access policy $P_U$ in step 830 instead. In response to receiving the revoke request from the car owner, process 800 retrieves the blacklist associated to the ID of the requestor and appends the blacklist accordingly in step 832. Particularly, if the revoke request contains ID of the car owner, process 800 appends the blacklist to include the ID of the car owner, i.e. [$id_O$]. If the revoke request contains ID of the delegated user, ID of the car owner who delegated the ID, and the associated access policy $P_U$, process 800 append the blacklist to include ID of the delegated user, ID of the car owner who delegated the ID, and the associated access policy $P_U$, i.e. [$id_U$, $id_O$, $P_U$].

Process 800 ends after step 812, 829 or 832.

The following second embodiment presents another instantiation based on hierarchical Identity Based Signature (IBS). In an IBS system, a user's identity acts as the user's public key, without the reliance on Public Key Infrastructure (PKI) and in turn public-key certificates. The user's private key corresponding to the user's identity is issued by a Key Generation Center (KGC) which has a global public key/private key pair.

In hierarchical IBS, the KGC can be seen at level 0, and it issues level-1 private keys corresponding to user identities while a level-1 private key issues level-2 private keys, and so on. In particular, a hierarchical IBS scheme consists of the following algorithms:

1. HSetUp($1^k$)→(GPK, GSK): This is a system setup algorithm that generates the global key pair GPK and GSK, where k is the security parameter.

2. HKeyGen($sk_{id_{i,L}}$, $id_{j,L+1}$, $P_{id_{j,L+1}}$)→$sk_{id_{j,L+1}}$: This is a key generation algorithm, taking as input a level-L private key corresponding to $id_{i,L}$, an identity $id_{j,L+1}$ and a policy $P_{id_{j,L+1}}$ for $id_{j,L+1}$, and outputting a level-(L+1) private key $sk_{id_{j,L+1}}$ corresponding to $id_{j,L+1}$, and bounded by $P_{id_{j,L+1}}$. It is noted that GSK can be viewed as a level-0 private key corresponding to a special identity. The subscript "L" in $id_{i,L}$ is immaterial and it simply logically denotes that is a level-L identity.

3. HSign($sk_{id_{j,L}}$, m)→σ: This is a signing algorithm, taking as input a level-L private key corresponding to $id_{j,L}$ and a message m, outputting a signature σ on m.

4. HVerify(σ, m, $id_{j,L}$, $P_{id_{j,L}}$, $id_{i,L-1}$, $P_{id_{i,L-1}}$, $id_{k,L-2}$, $P_{id_{k,L-2}}$, ..., GPK)→{0, 1}: This is a signature verification algorithm, taking as input a signature σ, the message m, and a chain of identities and the associated access policies including the identity corresponding to the level-L private key that generates the signature, and the identity corresponding to the level-(L−1) private key that generates the level-L private key, and all the way down to GPK. The algorithm outputs a bit either 0 or 1.

Based on a hierarchical IBS scheme, the instantiation can be described using FIG. 4. All the assumptions in the first embodiment remain, unless otherwise specified.

Step 420 is modified such that the car would generate a secret key (GSK) by executing HSetUp($1^k$) to generate (GPK, GSK). The car then stores the GSK securely in the secure storage module while leaving GPK public. The car is at level 0.

Step 435 is modified such that in response to receiving the request from the car owner, the car executes the key generation algorithm HKeyGen(GSK, $id_{O,1}$, NULL), taking as input the GSK, the ID of the first device to generate a level 1 authentication key $sk_{id_{O,1}}$. It should be noted that the car owner is at level 1. The level 1 authentication key and the GPK are transmitted to the car owner in step 440.

In step 445, instead of computing vd, the car owner generates a instead. Particularly, the car owner taps his/her mobile device to the car and receives the broadcast message containing ID $id_{Car}$ and a random number r. Based on the $id_{Car}$ and random number r, the car owner executes the signing algorithm, HSign($sk_{id_{O,1}}$, r), taking as input the first level authentication key of the car owner and the random number r, to generate σ, and then sends [0, $id_O$, σ] to the car, where 0 denotes "owner access". In step 450, the car verifies the blacklist and σ. In particular, the car checks the blacklist to determine whether $id_O$ is revoked, and aborts if it is. If the $id_O$ is not in the blacklist, the car continues to execute the signature verification algorithm, HVerify(σ, r, $id_{O,1}$, NULL, GPK), taking as input the signature σ, the random number r, the ID of the first device, and GPK and grant the access if the output is 1. Otherwise, the car rejects granting access.

In step 465, in response to receiving the ID of the delegated user, the car owner determines an access policy $P_{id_{U,2}}$, and executes the key generation algorithm, HKeyGen ($sk_{id_{O,1}}$, $id_{U,2}$, $P_{id_{U,2}}$) taking as input the first level authentication key, the ID of the second device and the access policy $P_{id_{U,2}}$ for $id_{U,2}$ to generate a level 2 authentication key $sk_{id_{U,2}}$. Thereafter, the car owner transmits the level 2 authentication key and the GPK to the delegated user via either direct delivery or remote delivery in step 470.

In step 480, instead of computing vd, the delegated user generates a instead. Particularly, the delegated user taps his/her mobile device to the car and receives the broadcast message containing ID $id_{Car}$ and a random number r. Based on the $id_{Car}$ and random number r, the delegated user computes α=HSign($sk_{id_{U,2}}$, r), and then sends a request containing [1, $id_{U,2}$, $id_{O,1}$, $P_{id_{U,2}}$, σ] to the car, where 1 denotes "delegated user access". Particularly, the delegated user execute the signing algorithm HSign($sk_{id_{U,2}}$, r), taking as input the second level authentication key and the random number r, to generate the signature σ. In step 485, the car verifies the $P_{id_{U,2}}$, blacklist and σ. In particular, upon receipt of the message, the car first checks whether $P_{id_{U,2}}$ is still valid, and aborts if $P_{id_{U,2}}$ does not hold any more. Otherwise, the car checks the blacklist to determine whether $id_{O,1}$ or $id_{U,2}$ is revoked, and aborts if it is. Otherwise, the car continues to compute b=HVerify(σ, r, $id_{U,2}$, $id_{O,1}$, NULL, GPK). Particular, the car executes the signature verification algorithm, HVerify(σ, r, $id_{U,2}$, $P_{id_{U,2}}$, $id_{O,1}$, NULL, GPK), taking as input the signature σ, the random number r, the ID of the second device, the $P_{id_{U,2}}$, the ID of the first device, and GPK. If b=1, the car grants the access, e.g., open the car door. Otherwise, the car rejects granting access.

The user revocation remains the same as the first embodiment

The following third embodiment presents another instantiation based on digital signature. The digital signature scheme consists of the following algorithms:

1. KeyGen($1^k$)→(PK, SK): it is key generation algorithm, which takes as input security parameter $1^k$, and outputs a public/private key pair (PK, SK).

2. Sign(SK, m)→σ: it is a signing algorithm, which takes as input private key SK and a message m, and outputs a signature σ on m.

3. Verify(σ, m, PK)→{0, 1}: this is signature verification algorithm, which takes as input a signature σ, message m, and public key PK, and outputs a bit either 0 or 1.

Based on the digital signature scheme, the instantiation can be described using FIG. 4. All the assumptions in the first embodiment remain, unless otherwise specified.

Step 420 is modified such that the car would generate a secret key ($SK_C$) by executing KeyGen($1^k$) to generate a pair of keys ($PK_C$, $SK_C$). The car then stores the $SK_C$ securely in the secure storage module while leaving $PK_C$ public.

Step 430 is modified such that car owner executes KeyGen($1^k$) to generate a pair of keys ($PK_O$, $SK_O$) for the car owner; transmits the public key of the car owner, $PK_O$, to car; and stores the private key, $SK_O$, securely in secure storage module. Step 435 is modified such that in response to receiving the public key of the car owner $PK_O$ from the car owner, the car executes the signing algorithm, Sign($SK_C$, $PK_O$) taking as input the $SK_C$, and the public key of the car owner to generate $σ_{C,O}$ where $σ_{C,O}$ serves as a digital certificate for the $PK_O$. The digital certificate is transmitted to the car owner in step 440. In an alternative embodiment, the car owner digital certificate $σ_{C,O}$ and the pair of keys for the car ($PK_C$, $SK_C$) are not required when a whitelist containing the public key of the car owner $PK_O$ is maintained in the car.

In step 445, instead of computing vd, the car owner generates a instead. Particularly, the car owner taps his/her mobile device to the car and receives the broadcast message containing ID $id_{Car}$ and a random number r. Based on the $id_{Car}$ and random number r, the car owner executes the signing algorithm, Sign($SK_O$, r) taking as input the private key of the car owner, $SK_O$ and the random number r to generate σ, and then sends [0, $PK_O$, $σ_{C,O}$, σ] to the car, where 0 denotes "owner access". In step 450, the car verifies the blacklist and σ. In particular, the car checks the blacklist to determine whether $PK_O$ is revoked, and aborts if it is. If the $PK_O$ is not in the blacklist, the car continues to execute both a first verification algorithm, Verify($σ_{C,O}$, $PK_O$, $PK_C$) taking as input the signature $σ_{C,O}$, the public key of the car owner and the public key of the car and a second verification algorithm, Verify(σ, r, $PK_O$) taking as input the signature σ, the random number r, the public key of the car owner, and grant the access if both output 1. Otherwise, the car rejects granting access. In the alternative embodiment, steps 445-450 would be modified such that the car owner sends [0, $PK_O$, σ] to the car, where σ=Sign($SK_O$, r). In response, the car would check whether $PK_O$ is in the whitelist. If $PK_O$ is in the whitelist, the car continues to verify σ by executing the second verification algorithm, Verify(σ, r, $PK_O$) taking as input the signature σ, the random number r, the public key of the car owner, and grant the access result from the second verification algorithm is 1. Otherwise, the car rejects granting access.

Step 460 is modified such that the delegated user executes KeyGen($1^k$) to generate a pair of keys ($PK_U$, $SK_U$); transmits public key $PK_U$ to car owner; and stores the private key $SK_U$ securely in secure storage module. Step 465 is modified such that in response to receiving $PK_U$ from the delegated user, the car owner determines an access policy $P_U$ and executes the signing algorithm Sign($SK_O$, $PK_U$∥$P_U$) taking as input the $SK_O$, and the public key of the delegated user and the access policy $PK_U$∥$P_U$ to generate $σ_{O,U}$ where $σ_{O,U}$ serves as a digital certificate for the $PK_U$. The digital certificate $σ_{O,U}$ together with the $PK_O$ and $σ_{C,O}$ are transmitted to the delegated user via either direct delivery or remote delivery in step 470. In the alternative embodiment, step 470 would be modified such that the digital signature of the car owner $σ_{C,O}$ is not transmitted to the delegated user.

In step 480, instead of computing vd, the delegated user generates a instead. Particularly, the delegated user taps his/her mobile device to the car and receives the broadcast message containing ID $id_{Car}$ and a random number r. Based on the $id_{Car}$ and random number r, the delegated user executes the signing algorithm, Sign($SK_U$, r) taking as input the private key of the delegated user, $SK_U$ and the random number r, to generate σ and then sends a request containing [1, $PK_U$, $P_U$, $σ_{O,U}$, $PK_O$, $σ_{C,O}$, σ] to the car, where 1 denotes "delegated user access". In step 485, the car verifies the $PK_O$, $P_U$, blacklist and σ. In particular, upon receipt of the message, the car first checks whether $P_U$ is still valid, and aborts if $P_U$ does not hold any more. Otherwise, the car checks the blacklist to determine whether $PK_O$ or $PK_U$ is revoked, and aborts if it is. Otherwise, the car continues to execute a third signature verification algorithm Verify($σ_{C,O}$, $PK_O$, $PK_C$) taking as input the signature $σ_{C,O}$, the public key of the car owner, and the public key of the car, a fourth signature verification algorithm Verify($σ_{O,U}$, $PK_U$||$P_U$, $PK_O$) taking as input the signature $σ_{O,U}$, the public key of the delegated user and the policy $PK_U$||$P_U$, and the public key of the car owner, and a fifth signature verification algorithm Verify(σ, r, $PK_U$) taking as input the signature σ, the random number r, the public key of the delegated user. If all return 1, the car grants the access, e.g., open the car door. Otherwise, the car rejects granting access. In the alternative embodiment, step 480 would be modified such that the delegated user sends a request containing [1, $PK_U$, $P_U$, $σ_{O,U}$, $PK_O$, σ]. In step 485, the car will first check: 1) whether $PK_O$ is in the whitelist; 2) whether $P_U$ is still valid; 3) whether $PK_O$ or $PK_U$ is in the blacklist. If the $PK_O$ is in the whitelist, $P_U$ is still valid and $PK_O$ or $PK_U$ is not in the blacklist, the car continues to verify $σ_{O,U}$ by executing a signature verification algorithm, Verify($σ_{O,U}$, $PK_U$, $PK_O$) taking as input the digital signature of the delegated user $σ_{O,U}$, the public key of the delegated user $PK_U$, the public key of the car owner $PK_O$. and verify σ, by executing another signature verification algorithm, Verify(σ, r, $PK_U$) taking as input the signature σ, the random number r, the public key of the user $PK_U$. If all return 1, the car grants the access, e.g., open the car door. Otherwise, the car rejects granting access.

The user revocation remains the same as the first embodiment except that for revoking a car owner, the car owner's public key is stored on the blacklist instead of ID. For revoking a delegated user, the user's public key $PK_U$, the delegator owner's public $PK_O$ and the access policy $P_U$ are stored in the blacklist instead of car owner's ID and delegator user's ID. In the alternative embodiment, instead of adding car owner's public key onto the blacklist, the car owner's public key $PK_O$ are removed from the whitelist.

The above is a description of embodiments of a method and system of a framework, implementing an identity-based cryptography for generating and distributing IDs and keys between a car, car owners, delegated users and a remote server for accessing a car. The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A device, wherein the device comprises a non-transitory memory having processor-executable instructions stored thereon, a processor coupled to the non-transitory memory, the processor-executable instructions when executed cause the processor to:
   transmit a request for an authentication key of a user of a vehicle to a third device, wherein the request for the authentication key comprises an identification (ID) of the user ($id_O$);
   receive an authentication key ($K_{id_O}$) from the third device; wherein the authentication key ($K_{id_O}$) is used to access the vehicle by the user; and
   generate a delegated authentication key ($K_{id_U}$) to a delegated user based on the authentication key ($K_{id_O}$) and an ID of the delegated user in response to receiving a request for a delegated authentication key from a second device, the request for delegated authentication key comprising the ID of the delegated user; wherein the delegated authentication key ($K_{id_U}$) is used to access the vehicle; wherein
   $K_{id_O}$=h(K, $id_{Car}$, $id_O$), where h(.) is a cryptographic hash function, $id_{Car}$ is an ID of the third device, and the device is configured to store the $K_{id_O}$ in a secured memory.

2. The device according to claim 1, wherein the processor is further configured to:
   generate and transmit a request to generate a new secret key;
   receive an authentication request from the third device; and
   transmit a superuser password, provided by the user, to the third device.

3. The device according to claim 1, wherein the processor is further configured to:
   receive the ID of the third device and a random number (r), from the third device;
   compute a Message Authentication Code (MAC) represented by vd using a MAC generation function with input parameters $K_{id_O}$ and r as vd=MAC($K_{id_O}$, r); and
   transmit an access request containing parameters [0, $id_O$, vd] to the third device where 0 denotes a requested access is from the user of the vehicle.

4. The device according to claim 3, wherein the processor is further configured to:
   receive a new authentication key ($K'_{id_O}$) from the third device;
   update the authentication key ($K'_{id_O}$) in memory with the new authentication key ($K'_{id_O}$).

5. The device according to claim 1 wherein the processor is further configured to:
   receive the ID of the second device ($id_U$),
   determine an access policy ($P_U$); and
   generate the delegated authentication key ($K_{id_U}$), where $K_{id_U}$=h($K_{id_O}$, $id_U$, $P_U$), wherein h(.) is the cryptographic hash function;
   store the $K_{id_U}$ in the secured memory; and
   transmit the delegated authentication key ($K_{id_U}$) to the second device.

6. The device according to claim 5, wherein the access policy ($P_U$) include one or more of validity period, speed limit, and mileage limit.

7. The device according to claim 1, wherein the processor is further configured to:
   update a blacklist in the third device.

8. The device according to claim 7, wherein updating the blacklist in the third device comprises:
   generating a revoke request containing the ID of user to be revoked; and
   transmitting the revoke request to the third device.

9. A method for a vehicle access authentication framework having a first device operated by a car owner, a second device operated by a delegated user, and a third device residing in a vehicle; the method which is applied to the first device comprising:

transmitting a request for an authentication key of a user of a vehicle to the third device, the request for the authentication key comprising an identification (ID) of the user ($id_O$);

receiving an authentication key ($K_{id_O}$) from the third device; wherein the authentication key ($K_{id_O}$) is used to access the vehicle by the user; and generating a delegated authentication key ($K_{id_U}$) to a delegated user based on the authentication key $K_{id_O}$ and an ID of the delegated user in response to receiving a request for a delegated authentication key from the second device, the request for the delegated authentication key comprising the ID of the delegated user; wherein the delegated authentication key ($K_{id_U}$) is used to access the vehicle; wherein $K_{id_O}$=h(K, $id_{Car}$, $id_O$), where h(.) is a cryptographic hash function, $id_{Car}$ is an ID of the third device, and the first device is configured to store the $K_{id_O}$ in a secured memory.

10. The method according to claim 9, further comprising:
generating and transmitting a request to generate a new secret key;
receiving an authentication request from the third device; and
transmitting a superuser password, provided by the user, to the third device.

11. The method according to claim 9, further comprising:
receiving the ID of the third device and a random number (r), from the third device;
computing a Message Authentication Code (MAC) represented by vd using a MAC generation function with input parameters $K_{id_O}$ and r as vd=MAC($K_{id_O}$, r); and
transmitting an access request containing parameters [0, $id_O$, vd] to the third device where 0 denotes a requested access is from the user of the vehicle.

12. The method according to claim 11, further comprising:
receiving a new authentication key ($K'_{id_O}$) from the third device;
updating the authentication key ($K'_{id_O}$) in a memory of the first device with the new authentication key ($K'_{id_O}$).

* * * * *

UNITED STATES PATENT AND TRADEMARK OFFICE
CERTIFICATE OF CORRECTION

PATENT NO. : 11,258,598 B2
APPLICATION NO. : 16/686861
DATED : February 22, 2022
INVENTOR(S) : Yang et al.

It is certified that error appears in the above-identified patent and that said Letters Patent is hereby corrected as shown below:

On the Title Page

Item (56), Page 2: Other Publications, Column 2, Line 10: "Science, pp. 4753, Springer-Verlag Berlin Heidelberg, New York," should read -- Science, pp. 47-53, Springer-Verlag Berlin Heidelberg, New York, --.

Signed and Sealed this
Nineteenth Day of July, 2022

Katherine Kelly Vidal
*Director of the United States Patent and Trademark Office*